United States Patent
Hoshino et al.

(10) Patent No.: US 12,166,441 B2
(45) Date of Patent: Dec. 10, 2024

(54) WORK MACHINE

(71) Applicant: Koki Holdings Co., Ltd., Tokyo (JP)

(72) Inventors: Kenichi Hoshino, Ibaraki (JP); Yasushi Nakano, Ibaraki (JP); Tomoaki Sudo, Ibaraki (JP); Eiji Nakayama, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 120 days.

(21) Appl. No.: 17/921,633

(22) PCT Filed: Mar. 31, 2021

(86) PCT No.: PCT/JP2021/013761
§ 371 (c)(1),
(2) Date: Oct. 27, 2022

(87) PCT Pub. No.: WO2021/220704
PCT Pub. Date: Nov. 4, 2021

(65) Prior Publication Data
US 2023/0170831 A1 Jun. 1, 2023

(30) Foreign Application Priority Data

Apr. 28, 2020 (JP) ................................. 2020-079341
Dec. 25, 2020 (JP) ................................. 2020-216753
Feb. 26, 2021 (JP) ................................. 2021-030739

(51) Int. Cl.
*H02P 23/00* (2016.01)
*H02P 27/08* (2006.01)

(52) U.S. Cl.
CPC .............. *H02P 23/00* (2013.01); *H02P 27/08* (2013.01)

(58) Field of Classification Search
CPC .......... H02P 27/06; H02P 27/08; H02P 23/00; H02P 2201/09
See application file for complete search history.

(56) References Cited

U.S. PATENT DOCUMENTS 5,710,699 A * 1/1998 King ....................... B60L 50/40
  318/139
8,648,574 B2 * 2/2014 Ueno ........................ H02P 9/48
  290/1 A (Continued)

FOREIGN PATENT DOCUMENTS

JP 2018155100 10/2018
JP 2018529307 10/2018

(Continued)

OTHER PUBLICATIONS

"International Search Report (Form PCT/ISA/210) of PCT/JP2021/013761," mailed on Jun. 1, 2021, with English translation thereof, pp. 1-4.

*Primary Examiner* — Thai T Dinh
(74) *Attorney, Agent, or Firm* — JCIPRNET

(57) ABSTRACT

Provided is a work machine capable of improving workability. The work machine is provided with: a motor 14; a first power supply unit 180 connected to a battery pack 5 and supplying a boosted power to the motor 14; and a second power supply unit 130 connected to an external AC power supply and supplying a boosted power to the motor 14. The voltage and current of the first power supply unit 180 and the voltage and current of the second power supply unit 130 can be variably controlled by a control circuit 182 and a control circuit 136, respectively. The control circuits 136, 182 perform control so that the power output from the respective first power supply unit 180 and the second power supply unit 130 is combined and supplied to the motor 14.

16 Claims, 24 Drawing Sheets

(56) References Cited

U.S. PATENT DOCUMENTS

| | | | | |
|---|---|---|---|---|
| 8,736,218 B2* | 5/2014 | Matsuyama | ........ | B60L 15/2009 |
| | | | | 318/800 |
| 9,878,635 B1* | 1/2018 | Khaligh | ................. | B60L 58/20 |
| 10,511,162 B2* | 12/2019 | Li | ........................... | H02M 3/04 |
| 11,114,959 B2* | 9/2021 | Oka | ........................ | B60L 58/12 |
| 2009/0027930 A1* | 1/2009 | Usui | ................... | H02M 1/4225 |
| | | | | 363/84 |
| 2011/0273148 A1* | 11/2011 | Ueno | ........................ | H02P 9/48 |
| | | | | 322/28 |

FOREIGN PATENT DOCUMENTS

| | | |
|---|---|---|
| JP | 2019170016 | 10/2019 |
| WO | 2017047123 | 3/2017 |
| WO | 2019159834 | 8/2019 |

* cited by examiner

| temperature of battery pack | voltage of battery pack | boosting amount |
|---|---|---|
| I  80°C or more | — | stop boosting |
| II 80°C or less | ① 34V or more | max 100% battery current 25A |
| | ② 30~34V | max 75% battery current 20A |
| | ③ 28~30V | max 50% battery current 16A |
| | ④ 28V or less | stop boosting |

※when boosting amount is decreased, battery voltage increases, but boosting amount is not increased

| | target voltage | effective current |
|---|---|---|
| (1) when PVd=PVa | DC-side boosted voltage PVd: 370V<br>AC-side boosted voltage PVa: 370V | DC-side power supply current consumption: 3A<br>AC-side power supply current consumption: 3A |
| (2) when PVd ≤ PVa + 5V | DC-side boosted voltage PVd: 373V (less than 5V)<br>AC-side boosted voltage PVa: 370V | DC-side power supply current consumption: 4A<br>AC-side power supply current consumption: 2A |
| (3) when PVd ≥ PVa + 5V | DC-side boosted voltage PVd: 375V (5V or more, duty 40%~45%)<br>AC-side boosted voltage PVa: 370V | DC-side power supply current consumption: 5.9A<br>AC-side power supply current consumption: 0.1A |
| (4) when PVd ≥ PVa + 5V, and current limitation (2A) | DC-side boosted voltage PVd: 375V (5V or more, duty 35%~40%)<br>AC-side boosted voltage PVa: 370V | DC-side power supply current consumption: 2A<br>AC-side power supply current consumption: 4A |

WORK MACHINE

CROSS-REFERENCE TO RELATED APPLICATION

This application is a 371 application of the International PCT application serial no. PCT/JP2021/013761, filed on Mar. 31, 2021, which claims the priority benefits of Japan Patent Application No. 2020-079341, filed on Apr. 28, 2020, Japan Patent Application No. 2020-216753, filed on Dec. 25, 2020, and Japan Patent Application No. 2021-030739, filed on Feb. 26, 2021. The entirety of each of the above-mentioned patent applications is hereby incorporated by reference herein and made a part of this specification.

TECHNICAL FIELD

The present invention relates to a work machine such as an air compressor.

BACKGROUND ART

Hitherto, work machines that operate with power supplied from an external AC power supply such as a commercial power supply have become known. There is an upper limit to a current value input from the AC power supply due to restrictions on the capacity of a breaker.

CITATION LIST

Patent Literature

[Patent Literature 1]
Japanese Patent Laid-Open No. 2018455100

SUMMARY OF INVENTION

Technical Problem

When a driving current value of a motor increases and a current value input from an AC power supply approaches an upper limit, a driving current value cannot be increased any more, and there is room for improvement in terms of workability.

In view of the above problem, an object of the present invention is to provide a work machine capable of improving workability.

Solution to Problem

An aspect of the present invention is a work machine. The work machine includes a motor, a first power supply unit connected to a DC power supply, boosting an output voltage of the DC power supply, and outputting the boosted output voltage to the motor, a second power supply unit electrically connected to the motor in parallel together with the first power supply unit, connected to an external AC power supply, boosting an output voltage of the AC power supply, and outputting the boosted output voltage to the motor, and a controller controlling boosting amounts of the first power supply unit and the second power supply unit, in which the controller controls the boosting amounts of the first power supply unit and the second power supply unit so that power from the first power supply unit and power output from the second power supply unit are combined and supplied to the motor, and an output voltage value of the first power supply unit becomes larger than an output voltage value of the second power supply unit.

The work machine may further include a first output current detection unit detecting an output current value of the first power supply unit, in which the controller may control a boosting amount of the first power supply unit based on the detected value of the first output current detection unit.

The controller may control the boosting amount of the first power supply unit so that the detected value of the first output current detection unit falls below a predetermined first current threshold value.

The work machine may further include a first output voltage detection unit detecting an output voltage value of the first power supply unit, and a second output voltage detection unit detecting an output voltage value of the second power supply unit, in which the controller controls the boosting amount of the second power supply unit so that the detected value of the second output voltage detection unit matches a predetermined second voltage target value, and controls the boosting amount of the first power supply unit so that the detected value of the first output voltage detection unit matches a predetermined first voltage target value which is larger than the second voltage target value.

The controller may control the boosting amount of the first power supply unit so that the detected value of the first output current detection unit fails below the first current threshold value while the first voltage target value is fixed.

The work machine may further include a rotation speed detection unit detecting a rotation speed of the motor, and a motor driving circuit connected between the first power supply unit and the second power supply unit and the motor and controlling driving of the motor by changing an amount of power to be supplied to the motor, in which the controller may be able to set a target rotation speed of the motor and controls the motor driving circuit so that the detected value of the rotation speed detection unit matches the target rotation speed.

The controller may be able to switch between an assist mode and a single mode, the assist mode being a mode in which power output from the first power supply unit and power output from the second power supply unit are combined and supplied to the motor, the single mode being a mode in which power output from the second power supply unit is supplied to the motor, and power is not supplied from the first power supply unit.

The controller may set the target rotation speed in the assist mode to be higher than the target rotation speed in the single mode.

The first power supply unit may be able to change an output voltage value by PAM control.

The work machine may further include a first output voltage detection unit detecting an output voltage value of the first power supply unit, in which the controller may control a boosting amount of the first power supply unit so that the detected value of the first output voltage detection unit matches a first voltage target value, may set the first voltage target value to be less than a predetermined assist threshold value in a case where an output current value of the AC power supply is less than a first current value, and may set the first voltage target value to be equal to or greater than the assist threshold value in a case where the current value of the AC power supply is equal to or greater than the first current value.

The controller may be able to change the first voltage target value in a range of the assist threshold value or more so that power output from the first power supply unit and power output from the second power supply unit are combined and supplied to the motor.

A work machine main body portion and an adapter may be electrically connected to each other, the work machine main body portion including the second power supply unit, the adapter being provided outside the work machine main body portion, having the battery pack mountable thereon, and including the first power supply unit.

The work machine may further include a power detection circuit detecting a state of power flowing through the first power supply unit and the second power supply unit, in which the controller may set a first target value, which is a target value of the output voltage of the first power supply unit, and a second target value, which is a target value of the output voltage of the second power supply unit, so that power output from the first power supply unit and power output from the second power supply unit are combined and supplied to the motor, and the controller may change the first target value and the second target value in accordance with the detected value of the power detection circuit.

The power detection circuit may detect an output voltage of the DC power supply, and the controller may decrease the first target value and the second target value more when the output voltage of the DC power supply is less than a first threshold value than when the output voltage of the DC power supply is equal to or greater than the first threshold value.

The controller may stop the output of the first power supply unit when the output voltage of the DC power supply is less than a second threshold value which is smaller than the first threshold value.

Note that any combination above-described components and modifications of expressions in a method, a system, and the like of the present invention are also effective as aspects of the present invention.

Advantageous Effects of Invention

According to a work machine according to the present invention, by making it possible to use a battery power supply in addition to an AC power supply, it is possible to improve workability of the work machine as compared with a case where the AC power supply is used alone. For example, in order to perform high-load work, it is necessary to deal with a large current, but a current equal to or larger than in the related art can be supplied to the work machine by using both the AC power supply and the battery power supply.

BRIEF DESCRIPTION OF DRAWINGS

FIG. 6 is a diagram illustrating a relationship between a battery pack internal temperature, a battery pack output voltage, and a boosting amount of a first power supply unit.

FIG. 19 is a diagram illustrating a relationship between effective voltages of an output voltage (DC-side boosting voltage PVd) of an assist power supply unit 50 and an output voltage (AC-side boosting voltage PVa) of a main boosting power supply unit 32 and effective currents of a DC-side current consumption and an AC-side power supply current consumption.

DESCRIPTION OF EMBODIMENTS

Figure 1:
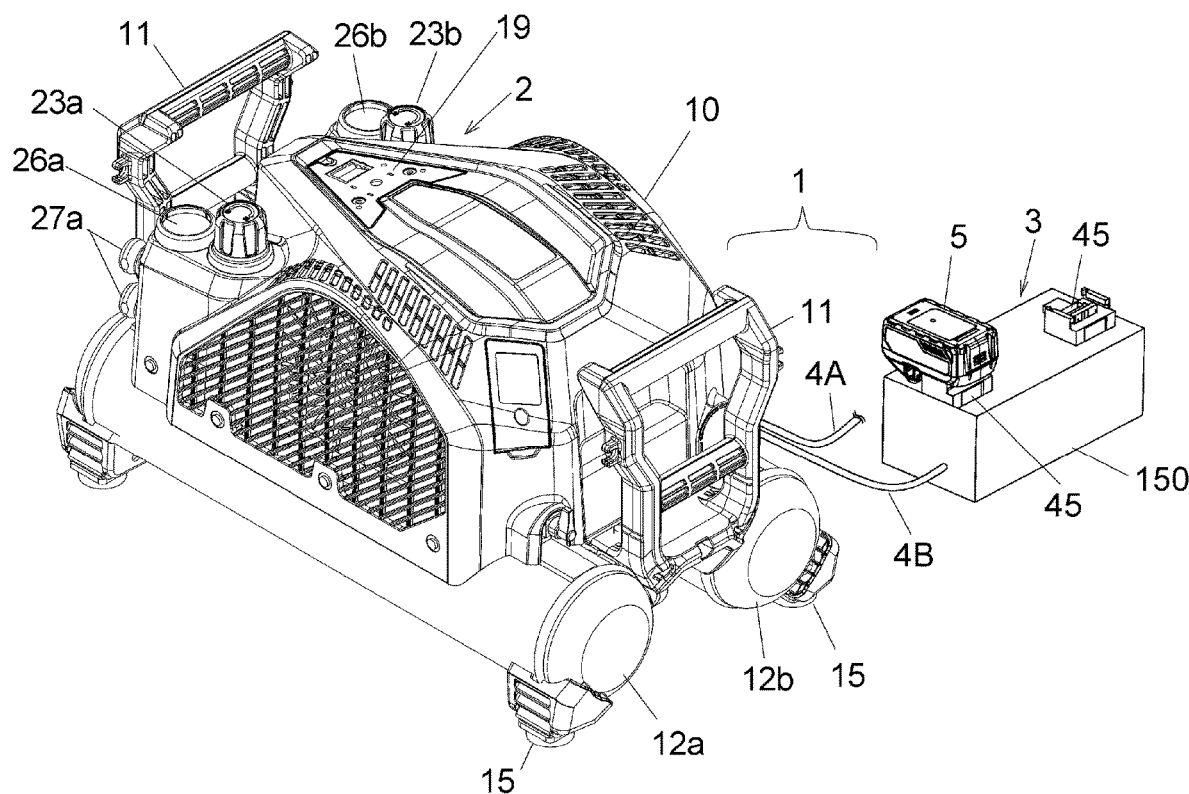
FIG. 1 is a perspective view illustrating the overall configuration of an air compressor which is a first embodiment of a work machine according to the present invention.

In the following, the same or equivalent components, members, and the like illustrated in the drawings will be denoted by the same reference numerals and signs, and repeated description will be omitted as appropriate. Embodiments are illustrative rather than limiting of the invention. All features and combinations thereof described in the embodiments are not necessarily essential to the invention.

Hereinafter, an air compressor, which is an embodiment of a work machine, will be described in detail using the drawings.

First Embodiment

Figure 2:
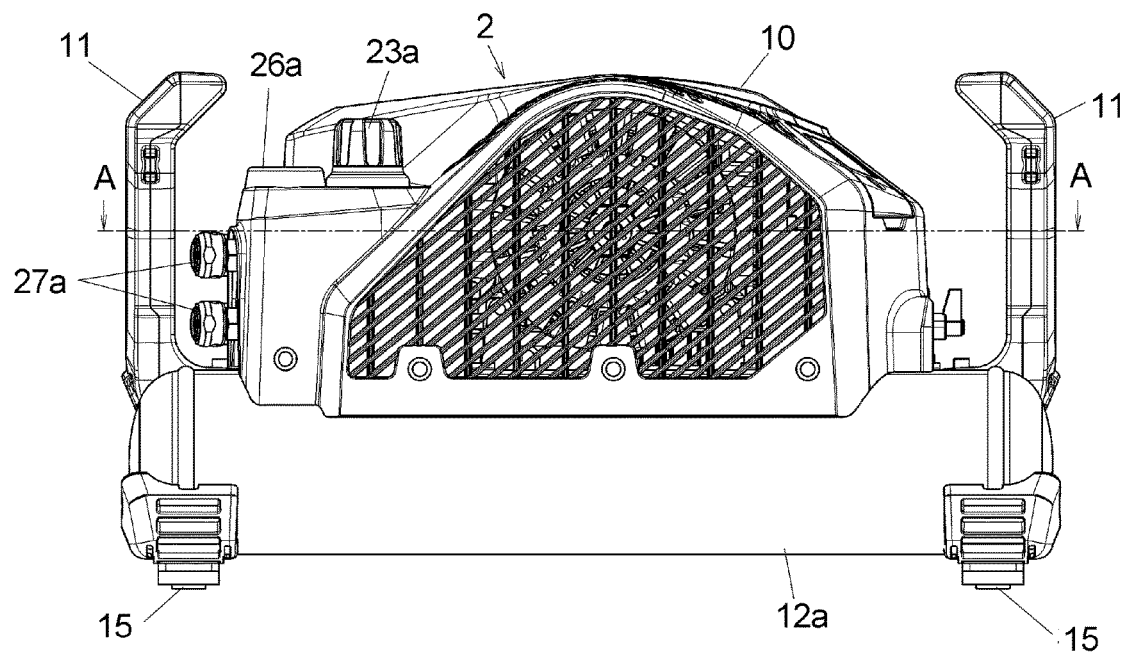
FIG. 2 is a front view of the same.
Figure 3:
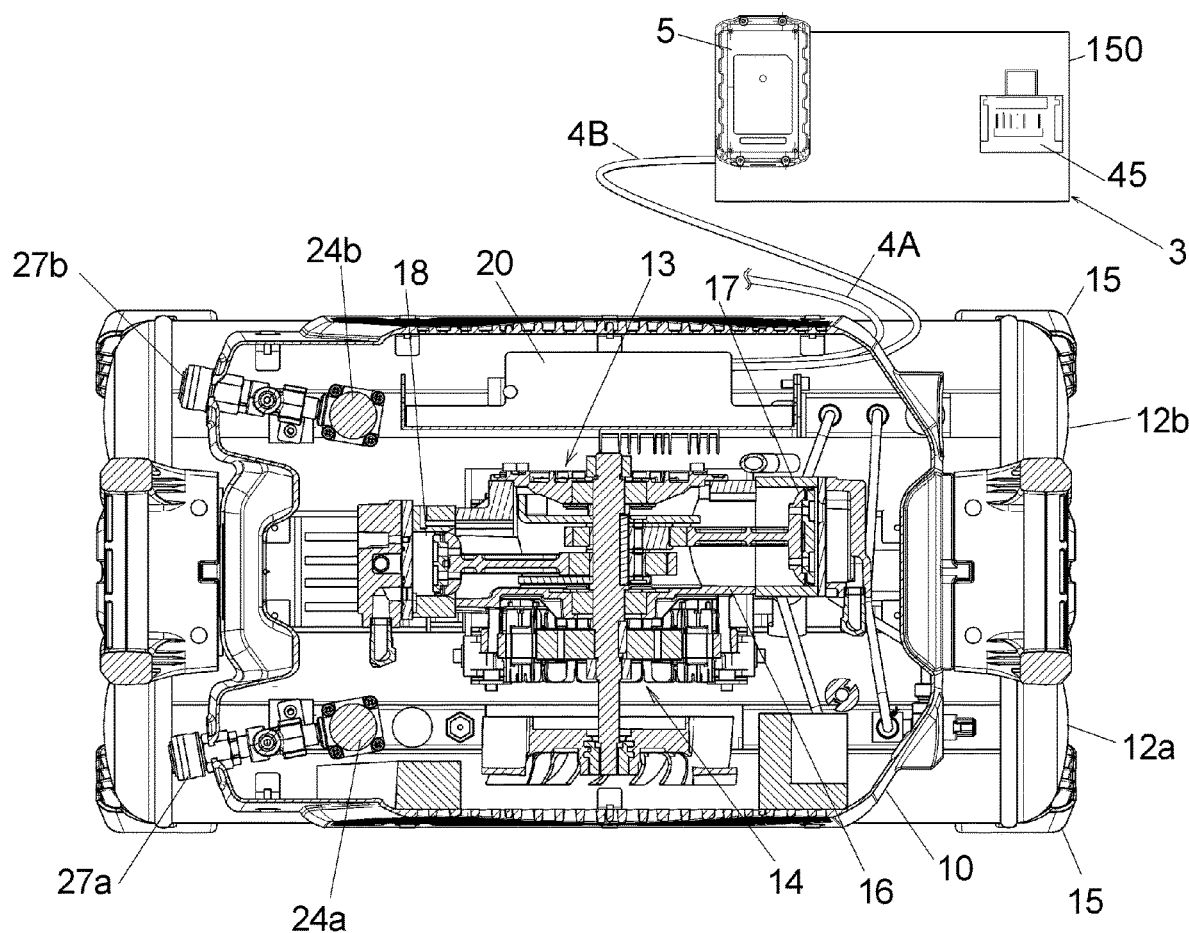
FIG. 3 is a plane cross-sectional view taken along line A-A in FIG. 2.

In a first embodiment of the present invention, FIG. 1 is a perspective view illustrating the overall configuration of an air compressor, FIG. 2 is a front view of the same, and FIG. 3 is a plane cross-sectional view taken along line A-A in FIG. 2. As illustrated in these drawings, an air compressor 1 includes an air compressor main body portion 2 and a boosting adapter 3, each of which is electrically connected to the other by an electrical connection cable 4B. Although not illustrated in the drawing, the air compressor main body portion 2 and the boosting adapter 3 may be configured to be detachably connected via a connector. The air compressor main body portion 2 may be a general air compressor that operates with a commercial AC power supply (AC 100 V), but is referred to as an "air compressor main body portion" for convenience in order to be distinguished from the air compressor 1, which is a concept that includes the boosting adapter 3. The air compressor main body portion 2 includes a power supply code 4A for connection to a plug socket of a commercial AC power supply.

As illustrated in FIGS. 1 to 3, the air compressor main body portion 2 includes a main body cover 10, transporting handles 11 provided on both sides thereof, a pair of parallel air tanks 12a and 12b for storing compressed air, a compression unit 13 (FIG. 3) that compresses air drawn from the outside and supplies it to the air tanks 12a and 12b, and a motor 14 (FIG. 3) that is connected to the compression unit 13 and drives the compression unit 13. The compression unit 13 and the motor 14 are disposed above the pair of air tanks 12a and 12b so that the axial direction of the motor 14 is substantially perpendicular to the longitudinal direction of the air tanks 12a and 12b. The air tanks 12a and 12b are provided with a leg portion 15 for preventing a direct contact with the ground to protect the air tanks 12a and 12b. The motor 14 is, for example, a DC motor and is configured such that the rotation speed thereof, and the like are controlled by controlling (for example, PWM control) an inverter unit 33 as a motor driving circuit in FIG. 4 that supplies power thereto by a control circuit 136. A user can perform operations such as turn-on/turn-off of the power supply of the air compressor 1, start-up and stopping of the motor, and switching of an operation mode by an operation panel unit 19. In addition, warnings such as for the internal pressure of the air tanks and overload are displayed on the operation panel unit 19.

The compression unit 13 is constituted by a first-stage low pressure-side compression unit 17 and a second-stage high pressure-side compression unit 18. The first-stage low pressure-side compression unit 17 and the second-stage high pressure-side compression unit 18 are disposed to face each other through a crankcase 16. The first-stage low pressure-side compression unit 17 compresses the outside air (atmospheric pressure) suctioned through the inside of the crankcase 16 and sends the compressed air to the second-stage high pressure-side compression unit 18 through a first-stage discharge pipe. The second-stage high pressure-side compression unit 18 compresses the compressed air supplied from the first-stage low pressure-side compression unit 17 to, for example, an allowable maximum pressure of 3.0 to 4.5 MPa and supplies the compressed air to the air tanks 12a and 12b, which communicate with each other via a second-stage discharge pipe.

The compressed air in the air tanks 12a and 12b is decompressed by decompression valves 24a and 24b and taken out to the outside via couplers 27a and 27b. Pressure near the couplers 27a and 27b can be monitored by pressure gauges 26a and 26b. An air tool such as a nailing machine is connected to each of the couplers 27a and 27b through a hose which is not illustrated in the drawing.

Pressure on output sides of the decompression valves 24a and 24b (pressure to be supplied to the air tool) can be adjusted by pressure adjustment members 23a and 23b. Regardless of the magnitude of pressure on an inlet side of the compressed air to the air tanks 12a and 12b, the pressure on the sides of the couplers 27a and 27b can be reduced to a fixed value equal to or less than a maximum pressure by the decompression valves 24a and 24b. That is, the couplers 27a and 27b can obtain compressed air having a fixed pressure regardless of the pressure in the air tanks 12a and 12b. Note that a drain discharge device is provided to discharge a drain and compressed air accumulated inside the air tanks 12a and 12b to the outside.

In the circuit configuration of FIG. 4, the air compressor main body portion 2 includes a rectifier 31, a second power supply unit 130, the inverter unit 33, the motor 14, and a position detector 134 which are portions below a virtual line X. The rectifier 31 rectifies AC power supplied from a commercial AC power supply 39 {AC 100 V (for example, a maximum rated current of 15 A of a plug socket)} and supplies the rectified power to the second power supply unit 130. The second power supply unit 130 includes a second boosting circuit 132, a control circuit 136, and a current detector 137. The rectifier 31, the second power supply unit 130, the inverter unit 33, and the like are accommodated in an accommodation case portion 20 inside the main body cover 10 in FIG. 3.

The second boosting circuit 132 includes a choke coil 140, a switching element 141 of which turn-on and turn-off (ON, OFF) are controlled by the control circuit 136, a diode 142, and a capacitor 143. The second boosting circuit 132 stores energy in the choke coil 140 when the switching element 141 is turned on, superimposes the energy on an input power supply (an output of the rectifier 31) when the switching element 141 is turned off, and outputs it as a boosted DC output voltage to both ends of the capacitor 143 through the diode 142. Here, the second boosting circuit 132 is controlled to have a constant voltage so that the DC output voltage is set to be a constant voltage.

The current detector 137 detects a current supplied to the motor 14 via the inverter unit 33, that is, a motor driving current, and outputs the current detected value to the control circuit 136. The position detector 134 detects rotor positional information of the motor 14, in other words, a motor rotation speed per unit time and outputs the detected motor rotation speed to the control circuit 136.

As illustrated in FIGS. 1 and 3, the boosting adapter 3 includes a plurality of battery pack mounting portions 45 on the outer surface of the outer case 150. A battery pack 5 can be detachably mounted on each of the battery pack mounting portions 45. In the case illustrated in the drawing, the battery pack 5 is mounted on one battery pack mounting portion 45. The battery pack 5 includes an accommodation case and a battery cell provided in the accommodation case. The battery cell may be either a primary battery or a secondary battery. As the battery cell, a lithium ion battery, a nickel metal hydride battery, a lithium ion polymer battery, a nickel-cadmium battery, and the like can be used. The battery pack mounting portion 45 includes an electrode terminal that connects to a terminal of the battery pack 5.

Figure 4:
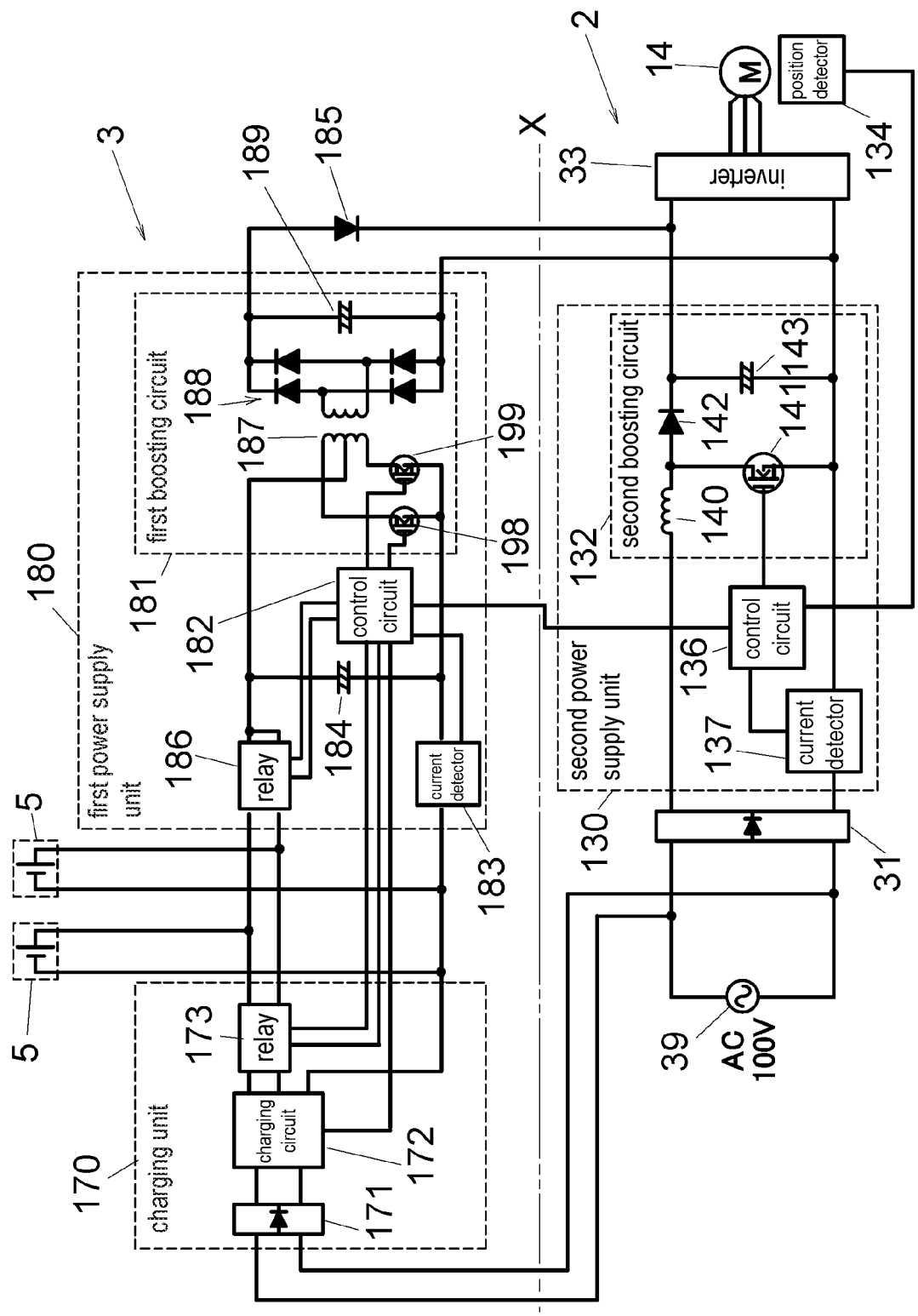
FIG. 4 is a circuit diagram of the first embodiment.

In the outer case 150 of the boosting adapter 3, a charging unit 170, a first power supply unit 180 and a diode 185, which are portions above the virtual line X in the circuit configuration of FIG. 4, are provided. The charging unit 170 includes a rectifier 171 that receives AC of 100 V supplied from the air compressor main body portion 2 side and rectifies AC power, a charging circuit 172 for charging the battery pack 5, and a first relay 173. The first relay 173 performs turn-on and turn-off for connection between the charging unit 170, the battery pack 5, and the first power supply unit 180.

The first power supply unit 180 includes a first boosting circuit 181, a control circuit 182, a current detector 183, a capacitor 184 provided on an input side of the first boosting circuit 181, and a second relay 186. The second relay 186 performs turn-on and turn-off for connection between the first power supply unit 180, the battery pack 5, and the charging unit 170.

The first boosting circuit 181 includes switching elements 198 and 199 push-pull connected to a primary side of a boosting transformer 187, a full wave rectifier 188 with four diodes bridge-connected to a secondary side of the boosting transformer 187, and a smoothing capacitor 189 on an output side thereof. The first boosting circuit 181 performs voltage variable control for increasing or reducing a DC voltage at both ends of the smoothing capacitor 189 on the output side by changing a duty at the time of alternately switching the switching elements 198 and 199 by the control circuit 182. In other words, the motor 14 can be driven by PAM control for increasing or reducing a voltage to be supplied to the inverter unit 33.

Next, the operation of the air compressor 1 with the boosting adapter 3 connected to the air compressor main body portion 2 will be described using FIGS. 5 to 8.

Figure 5:
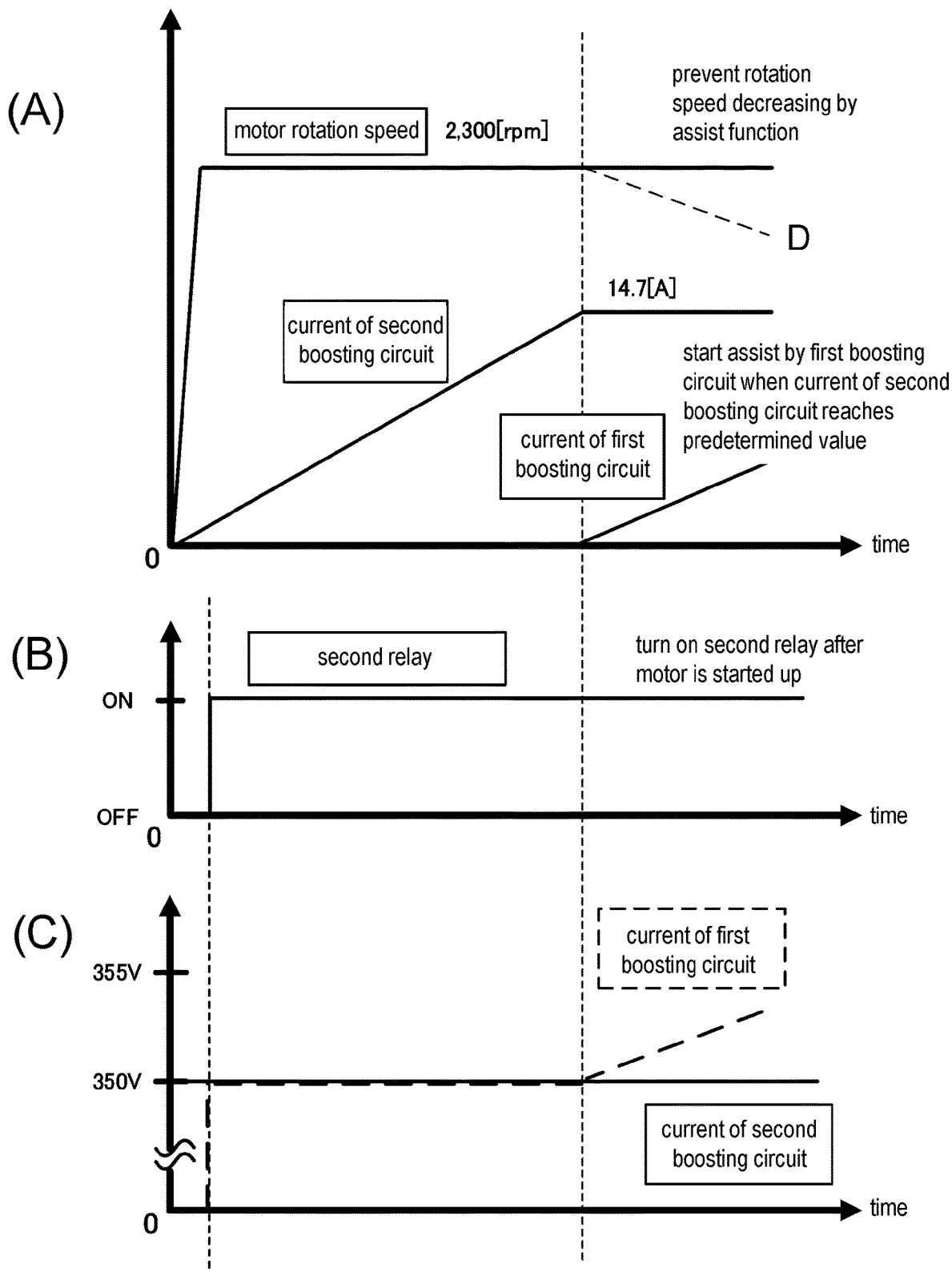
FIG. 5 is a diagram illustrating the operation of the first embodiment, (A) is a diagram illustrating a relationship between a motor rotation speed and output currents of first and second boosting circuits, (B) is a diagram illustrating turn-on and turn-off (ON, OFF) timings of a relay on a first boosting circuit input side, and (C) is a diagram illustrating a relationship between output currents of the first and second boosting circuits.

When the power supply of the air compressor 1 is turned on, a motor rotation speed increases to a predetermined setting value (for example, 2,300 rpm) as illustrated in (A) of FIG. 5. Compressed air is stored in the air tanks 12a and 12b by the compression unit 13 being driven by the rotation of the motor 14 at a constant speed. The control of the motor 14 at a constant speed is performed by controlling the switching element 141 in the second boosting circuit 132 by the control circuit 136 using the value of the motor rotation speed per unit time which is detected by the position detector 134 (an output voltage of the second boosting circuit 132 is controlled to be a constant voltage). Since a load on the motor 14 increases as the compressed air pressure increases, a current supplied to the second boosting circuit 132 for rotating the motor at a constant speed, that is, a detected current value detected by the current detector 137 increases substantially linearly and reaches a threshold value of 14.7 A. Since a maximum rated current of a general plug socket of a commercial AC power supply AC 100 V is 15 A, the threshold value of 14.7 A is selected as an appropriate value of less than 15 A. Note that the second boosting circuit 132 has a circuit configuration that does not use a transformer, and it may be considered that a current supplied to the second boosting circuit 132=an output current of the second boosting circuit 132=a motor driving current.

After the detected current value reaches the threshold value of 14.7 A, the second boosting circuit 132 is controlled by the control circuit 136 so that the current supplied to the second boosting circuit 132 does not exceed the threshold value. For this reason, if the boosting adapter 3 is not connected, a motor rotation speed will gradually decrease as indicated by a dashed line D.

In the first embodiment, the boosting adapter 3 is connected, the second relay 186 is turned on at a point in time when a motor rotation speed is set to be in a steady state to connect the first boosting circuit 181 and the battery pack 5 (the first relay 173 is maintained in an off state) after the power supply is turned on as illustrated in (B) of FIG. 5. Then, assist of the boosting adapter 3 is started from when the control circuit 136 informs the control circuit 182 that the threshold value of 14.7 A has been reached. In other words, the output current of the first boosting circuit 181 is added to the output current of the second boosting circuit 132 and supplied to the inverter unit 33 to maintain the rotation of the motor 14 at a constant speed. The control of the rotation of the motor 14 at a constant speed is performed by transmitting a detected value of a motor rotation speed per unit time, which is detected by the position detector 134, from the control circuit 136 to the control circuit 182 and controlling the switching elements 198 and 199 in the first boosting circuit 181 by using the detected value of the motor rotation speed. Even in a region exceeding the threshold value of 14.7 A, the output current of the first boosting circuit 181 for rotating the motor at a constant speed increases substantially linearly as a load on the motor 14 increases. Thereby, even when the pressure of compressed air in the air tanks 12a and 12b increases and a load on the motor increases, it is possible to prevent the rotation speed of the motor 14 from being reduced and to make the pressure of the compressed air in the air tanks 12a and 12b reach a required pressure more rapidly than in the related art.

(C) of FIG. 5 illustrates independent output characteristics of the second boosting circuit 132 and the first boosting circuit 181. The second boosting circuit 132 is controlled at a constant voltage so as to output a fixed voltage (for example, 350 V). The first boosting circuit 181 gradually increases an output voltage as a load on the motor increases (with the elapse of time after the threshold value) in order to perform PAM control of the motor 14 via the inverter unit 33. However, since the first boosting circuit 181 is connected in parallel with the second boosting circuit 132 via the diode 185, a current is supplied to the inverter unit 33 to compensate for the shortage of the output current of the second boosting circuit 132 in the region exceeding the threshold value. Note that the first power supply unit 180 may be configured not to perform assist by setting the output voltage value of the first boosting circuit 181 to be less than the output voltage value of the second power supply unit 130 in a case where the current value of the commercial AC power supply 39 is less than the threshold value of 14.7 A, or may be configured to stop the operation of the first boosting circuit 181 in a case where the current value of the commercial AC power supply 39 is less than the threshold value of 14.7 A.

FIG. 6 is a diagram illustrating a relationship between the internal temperature and output voltage of the battery pack 5 and a boosting amount of the first power supply unit 180. I. When the internal temperature is 80° C. or higher, boosting is stopped. II. When the internal temperature is less than 80° C., (1) 34 V or more—up to the battery pack current of 25 A at most (max 100%), (2) 30 V to 34 V—up to the battery pack current of 20 A at most (max 75%), (3) 28 V to 30 V—up to the battery pack current of 16 A at most (max 50%), and (4) 28 V or less—boosting is stopped. However, the output voltage of the battery pack is increased when the boosting amount is reduced, but the boosting amount is not increased.

Figure 7:
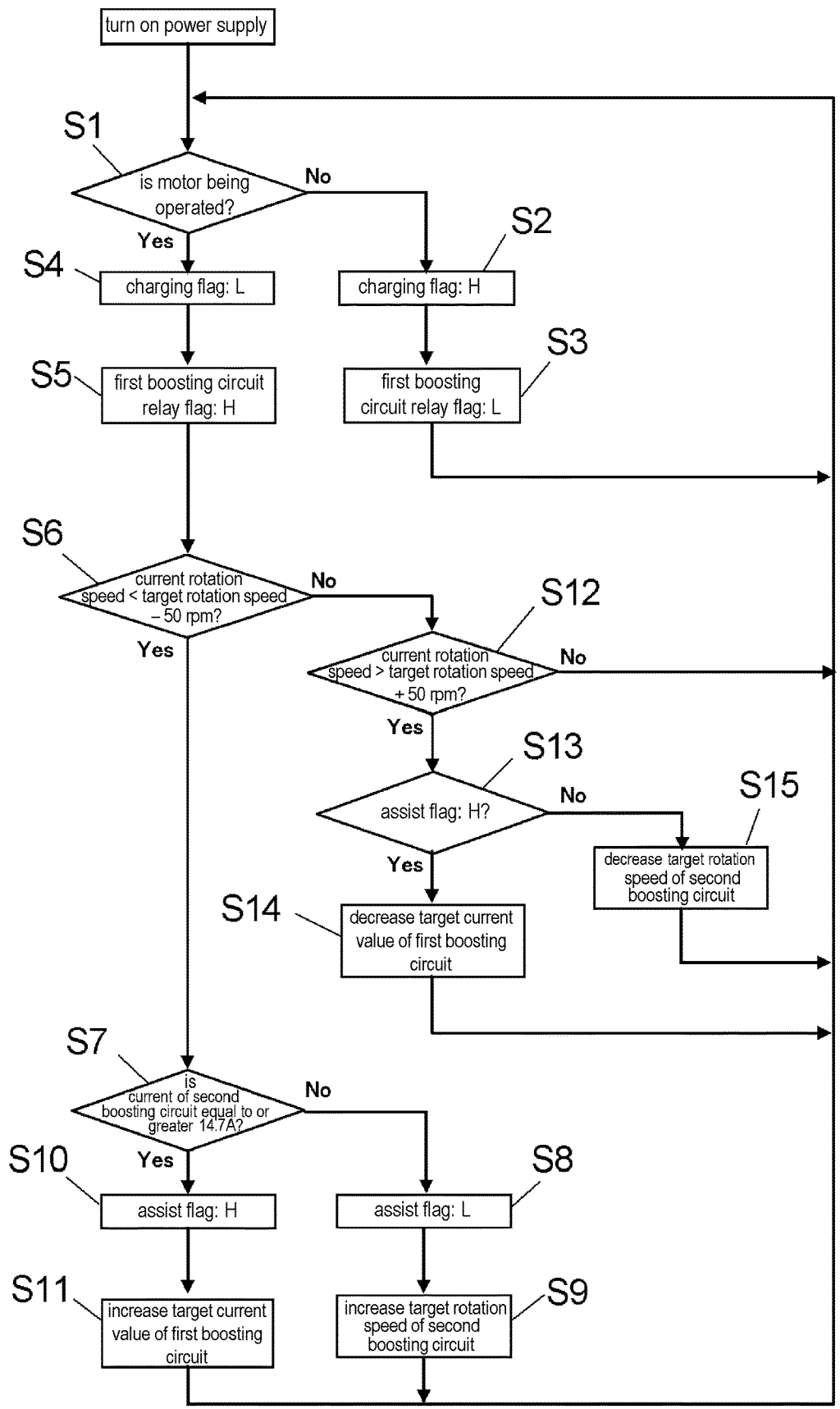
FIG. 7 is a flowchart illustrating the operation of the first embodiment.
Figure 8:
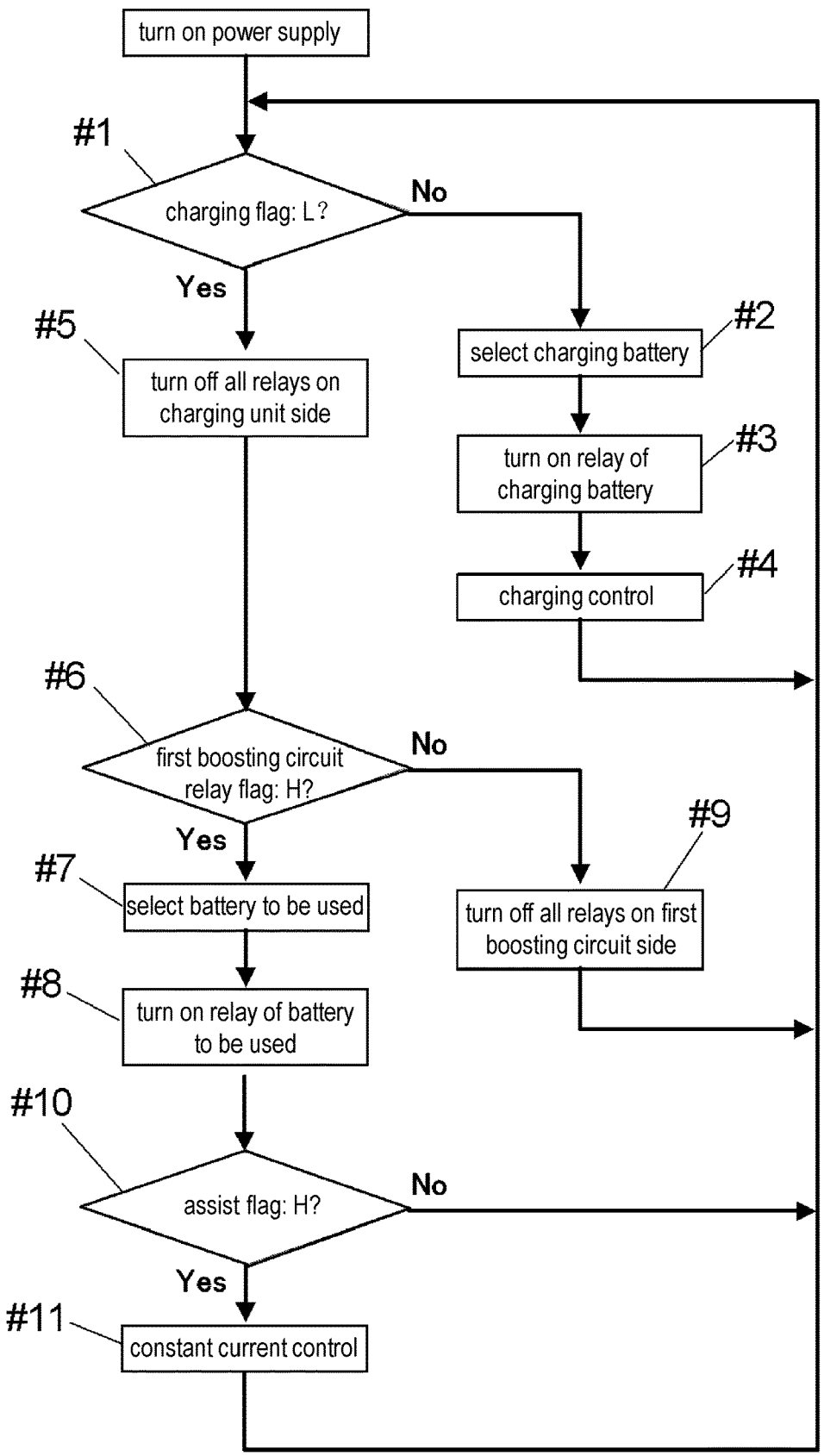
FIG. 8 is a flowchart regarding a relay operation in FIG. 4.

FIG. 7 is a flowchart illustrating the operation in the first embodiment, and FIG. 8 is a flowchart regarding operations of the first and second relays 173 and 186 in FIG. 4. Note that a "battery" in the flowchart of FIG. 8 is a simplified representation of the battery pack 5.

In FIG. 7, when the power supply of the air compressor 1 is "turned on", it is determined in step S1 whether or not "the motor is operating". After the power supply is turned on, a determination result in step S1 is No until the motor is started up, "a charging flag H" is set in step S2, and "a first boosting circuit relay flag L" regarding the second relay 186 on the input side of the first boosting circuit 181 is set in step S3.

In parallel with this, in FIG. 8, it is determined whether or not "a charging flag: L" is set in step #1 after the power supply of the air compressor 1 is "turned on", a determination result in step #1 is No when "a charging flag H" is set in step S2, and the battery pack 5 is charged. That is, when "selection of charging battery" is performed in step #2, "a relay of the charging battery is turned on" in step #3, the first relay 173 on the output side of the charging unit 170 is turned on, and connection can be turned on or turned off in the relay for each battery pack, the relay of the selected battery pack is turned on. In addition, appropriate "charging control" is performed so that the battery pack 5 is fully charged in step #4.

When a motor start-up operation of the air compressor 1 is performed, a determination result in step S1 in FIG. 7 is Yes, "a charging flag: L" is set in step S4, and "a first boosting circuit relay flag: H" is set in step S5.

When "the charging flag: L" is set in step S4, a determination result in step #1 in FIG. 8 is Yes, and "all relays on charging unit side are turned off" in step #5. That is, the first relay 173 is turned off, and the battery pack 5 is disconnected from the charging unit 170. Then, in step #6, "a first boosting circuit relay flag: H" is determined. In a case where a determination result is Yes, "selection of a battery to be used" is performed in step #7, and "a relay of the battery to be used is turned on" in step #8. That is, the battery pack 5 to be used is connected to the first boosting circuit 181 as a DC power supply. Note that, in a case where a determination result in step #6 is No, "all relays on a first boosting circuit side are turned off" in step #9, that is, the operation returns to a chargeable state and returns to step #1.

In FIG. 7, after step S5, it is determined in step S6 whether or not "the current rotation speed of the motor 14<a target rotation speed −50 rpm" is established. Immediately after the motor is started up, a determination result is Yes, and it is determined in step S7 whether "a current of the second boosting circuit is equal to or greater than 14.7 A". A determination result is No, "an assist flag: L" is set in step S8, "a target rotation speed of the second boosting circuit is increased" in step S9, and the operation returns to step S1.

When "an assist flag: L" is set in step S8, a result of determination regarding whether "an assist flag: H" is set in step #10 in FIG. 8 is No, and the operation returns to step #1. In this state, a boosting operation of the first power supply unit 180 is not performed (boosting amount :0).

When the rotation of the motor 14 continues and the pressure of compressed air in the air tanks 12a and 12b increases, a load on the motor 14 increases, a result of determination regarding "the current value of the second boosting circuit is equal to or greater than 14.7 A" in step S7 is Yes, "an assist flag: H" is set in step S10, "a target current value of the first boosting circuit is increased" in step S11, and the operation returns to step S1. Thus, the boosting amount of the first power supply unit 180 increases whenever steps S6, S7, S10, and S11 are performed. However, the boosting amount has an upper limit as described in FIG. 6.

As the boosting amount of the first power supply unit 180 increases, the motor rotation speed increases, a determination result in step S6 is No, and it is determined in step S12 whether or not "the current rotation speed >a target rotation speed+50 rpm". When the determination result is No, the current rotation speed is within the range of the target rotation speed ±50 rpm, and the operation returns to step S1. When the determination result in step S12 is Yes, it is determined in step S13 whether "an assist flag: H" is set. When the determination result is Yes, "the target current value of the first boosting circuit is decreased" in step S14, and the operation returns to step S1. When the determination result in step S13 is No, "the target rotation speed of the second boosting circuit is decreased".

In FIG. 8, after "a relay of a battery to be used is turned on" in step #8, it is determined in step #10 whether or not "an assist flag: H" is set. When a determination result is No, the operation returns to step #1, but when a determination result is Yes, "constant current control" of the second power supply unit 130 is performed in step #11.

Note that, in a case where compressed air in the air tanks 12a and 12b is used and the internal pressure of the tanks decreases, a load on the motor 14 decreases, a motor rotation speed increases, and a determination result in step S6 is No. Further, in a process in which a driving current value of the motor 14 decreases (a process in which a load on the motor decreases) due to the processes of steps S12, S13, S14, and S15, an operation of preferentially making a current value to be output from the first power supply unit 180 to the motor 14 smaller than a current value to be output from the second power supply unit 130 to the motor 14.

Figure 9:
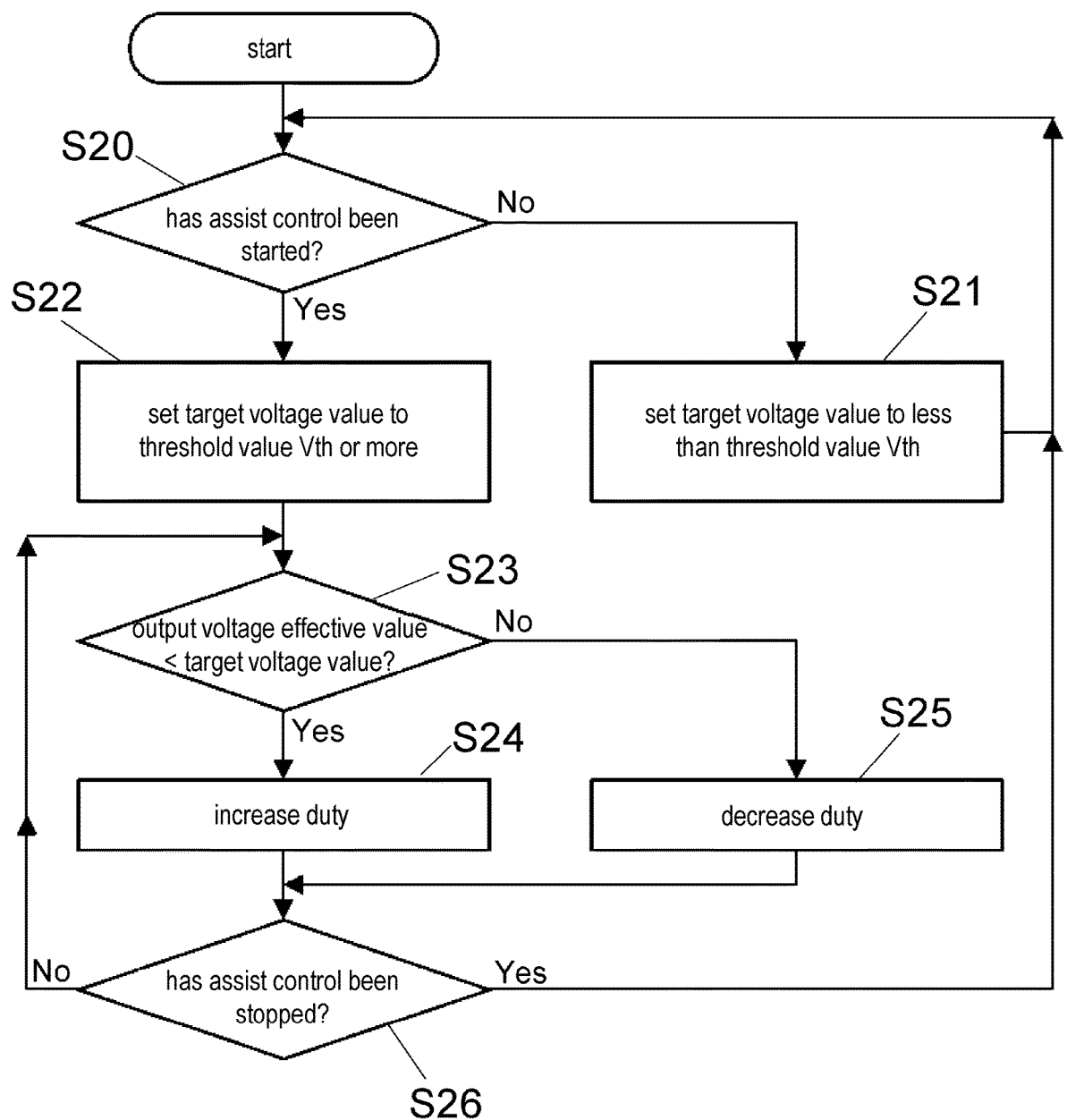
FIG. 9 is a flowchart illustrating an example of assist control (PAM control) of a first power supply unit 180 in the first embodiment.

FIG. 9 is a flowchart illustrating an example of assist control (PAM control) of the first power supply unit 180. After the operation is started, the control circuits 136 and 182 determine in step S20 whether or not to start assist control. When a determination result in step S20 is No, a target voltage value of the first boosting circuit 181 is set to be less than an assist threshold value Vth (second boosting circuit output voltage: 350 V) in step S21, and the operation returns to step S20. When a determination result in step S20 is Yes, the target voltage value is set to equal to or greater than the assist threshold value Vth in step S22, and it is determined in step S23 whether or not an output voltage effective value of the first boosting circuit 181 is smaller than the target voltage value. In order to perform PAM control of the motor 14 through the inverter unit 33, when the output voltage effective value of the first boosting circuit 181 is smaller than the target voltage value, a determination result in step S23 is Yes, and the duties of the switching elements 198 and 199 of the first boosting circuit 181 are increased in step S24. Thereafter, it is determined in step S26 whether or not to stop the assist control. When a determination result in step S23 is No, the duties of the switching elements 198 and 199 of the first boosting circuit 181 are decreased in step S25, and it is determined in step S26 whether or not to stop the assist control. When a determination result in step S26 is Yes, the assist control is stopped, and the operation returns to step S20. When a determination result in step S26 is No, the assist control is continued, and the operation returns to step S23.

In the operation of the flowchart in FIG. 9, the duties of the switching elements are feedback-controlled by an output voltage effective value. A target voltage value can be set arbitrarily, and a power assist operation can be executed flexibly. Further, in a range where the target voltage value is set to the assist threshold value Vth or greater in step S22, the target voltage value is determined according to an actual motor rotation speed and a load current, or an elapsed time after assist has started.

According to the first embodiment, the following effects can be achieved.

(1) The air compressor 1 as a work machine is provided with the first power supply unit 180 that is connected to the battery pack 5 and can supply power to the motor 14, apart from the second power supply unit 130 that operates by an AC power supply and supplies power to the motor 14, and thus the power supplied from the first power supply unit 180 can be added to the power supplied from the second power supply unit 130 to the motor 14. In addition, the first power supply unit 180 adjusts an output voltage value of the battery pack 5 in accordance with a current value of the AC power supply and outputs the adjusted output voltage value to the motor 14, and thus power supplied from the first power supply unit 180 to the motor 14 can be controlled appropriately. For this reason, it is possible to achieve an improvement in the workability of the air compressor 1, and specifically, the efficiency of air compression work.

(2) Since the first power supply unit 180 includes the first boosting circuit 181, and the second power supply unit 130 includes the second boosting circuit 132, the motor 14 can be driven at a high voltage of, for example, approximately 350 V, and it is easy to efficiently drive the motor 14 at high speed, as compared to low-voltage driving.

(3) The first power supply unit 180 includes the first boosting circuit 181, an output voltage value can be changed by PAM control, and power can be supplied from the first power supply unit 180 to the motor 14 only when required. For example, the first power supply unit 180 can perform control for setting an output voltage value to be less than an output voltage value of the second power supply unit 130 of constant voltage control in a case where a current value of the AC power supply is less than a first current value (14.7 A which is slightly smaller than 15 A which is a maximum rated current of a commercial power supply plug socket of AC 100 V) and setting the output voltage value to equal to or greater than the output voltage value of the second power supply unit 130 in a case where the current value of the AC power supply is equal to or greater than the first current value. In addition, the first power supply unit 180 can perform control for gradually increasing the output voltage value as a load on the motor 14 increases, and can also operate the motor 14 at a constant speed.

(4) The first power supply unit 180 can reduce an allowable maximum value of an input current from the battery pack 5 to itself continuously or in a stepwise manner with a decrease in the output voltage of the battery pack 5, and can achieve appropriate protection of the battery pack 5.

(5) Since the air compressor 1 includes a charging circuit 172 that charges the battery pack 5 using an AC power supply, the charging circuit 172 can charge the battery pack 5 when power is not supplied from the first power supply unit 180.

(6) In a process in which a driving current value of the motor 14 is decreased, an output current value from first power supply unit 180 to motor 14 can be decreased with preference over the output current value from the second power supply unit 130 to the motor 14, and thus it is possible to reduce the consumption of the battery pack 5, which is the power supply of the first power supply unit 180.

(7) In the case of a structure in which the air compressor main body portion 2 as a work machine main body portion including the second power supply unit 130 and the boosting adapter 3 provided outside the air compressor main body portion 2 and including the first power supply unit 180 are connected to each other by the cable 4B, the existing air compressor can be used as the air compressor main body portion 2, and the range of application is wide.

Note that a part or all of the above-described first embodiment can be described as the following additions, but is not limited to the following.

(Addition 1) A work machine including:
a motor;
a first power supply unit connected to a battery pack and supplying power to the motor; and
a second power supply unit connected to an external AC power supply and supplying power to the motor,
wherein the first power supply unit adjusts an output voltage value of the battery pack in accordance with a current value of the AC power supply and outputs the adjusted output voltage value to the motor.

(Addition 2) The work machine according to addition 1, wherein the first power supply unit includes a boosting circuit and is able to change an output voltage value by PAM control.

(Addition 3) The work machine according to addition 1 or 2, wherein the first power supply unit sets an output voltage value to be less than an output voltage value of the second power supply unit in a case where a current value of the AC power supply is less than a first current value, and sets the output voltage value to equal to or greater than the output voltage value of the second power supply unit in a case where the current value of the AC power supply is equal to or greater than the first current value.

(Addition 4) The work machine according to addition 3, wherein the second power supply unit includes a boosting circuit that outputs a predetermined constant voltage.

(Addition 5) The work machine according to addition 4, wherein the predetermined constant voltage is 350 V.

(Addition 6) The work machine according to any one of additions 3 to 5, wherein the first current value is 14.7 A.

(Addition 7) The work machine according to any one of additions 1 to 6, wherein the first power supply unit gradually increases an output current value as a load on the motor increases.

(Addition 8) A work machine including:
a motor;
a first power supply unit connected to a battery pack and supplying power to the motor; and
a second power supply unit connected to an external AC power supply and supplying power to the motor, wherein, when a current value supplied from the AC power supply increases and reaches a predetermined value in a process in which a driving current value of the motor increases, a current value to be output from the first power supply unit to the motor is thereafter increased with preference over a current value to be output from the second power supply unit to the motor.

(Addition 9) A work machine including:

a motor;

a first power supply unit connected to a battery pack and supplying power to the motor; and a second power supply unit connected to an external AC power supply and supplying power to the motor, wherein, when a current value supplied from the AC power supply increases and reaches a predetermined value, the first power supply unit increases a current value to be output to the motor so that the supplied current value does not increase.

(Addition 10) The work machine according to addition 8 or 9, wherein the first power supply unit stops power from being supplied to the motor during a period before the supplied current value reaches the predetermined value in a process in which the supplied current value increases.

(Addition 11) The work machine according to any one of additions 8 to 10, wherein, after the supplied current value increases and reaches the predetermined value in a process in which the driving current value of the motor increases, the first power supply unit increases a current value to be output to the motor and drives the motor at a constant rotation speed.

(Addition 12) The work machine according to any one of additions 8 to 11, wherein the first power supply unit includes a boosting circuit and changes a current value to be output to the motor under the control of the boosting circuit.

(Addition 13) The work machine according to any one of addition 8 to 12, wherein the first power supply unit continuously or gradually reduces an allowable maximum value of a current to be input from the battery pack to itself as an output voltage of the battery pack decreases.

(Addition 14) The work machine according to any one of addition 8 to 13, wherein, in a process in which the driving current value of the motor decreases, the current value to be output from the first power supply unit to the motor is decreased with preference over the current value to be output from the second power supply unit to the motor.

(Addition 15) The work machine according to any one of addition 8 to 14, wherein a work machine main body portion and an adapter are electrically connected to each other, the work machine main body portion including the second power supply unit, the adapter being provided outside the work machine main body portion, having the battery pack mountable thereon, and including the first power supply unit.

Second Embodiment

Figure 10:
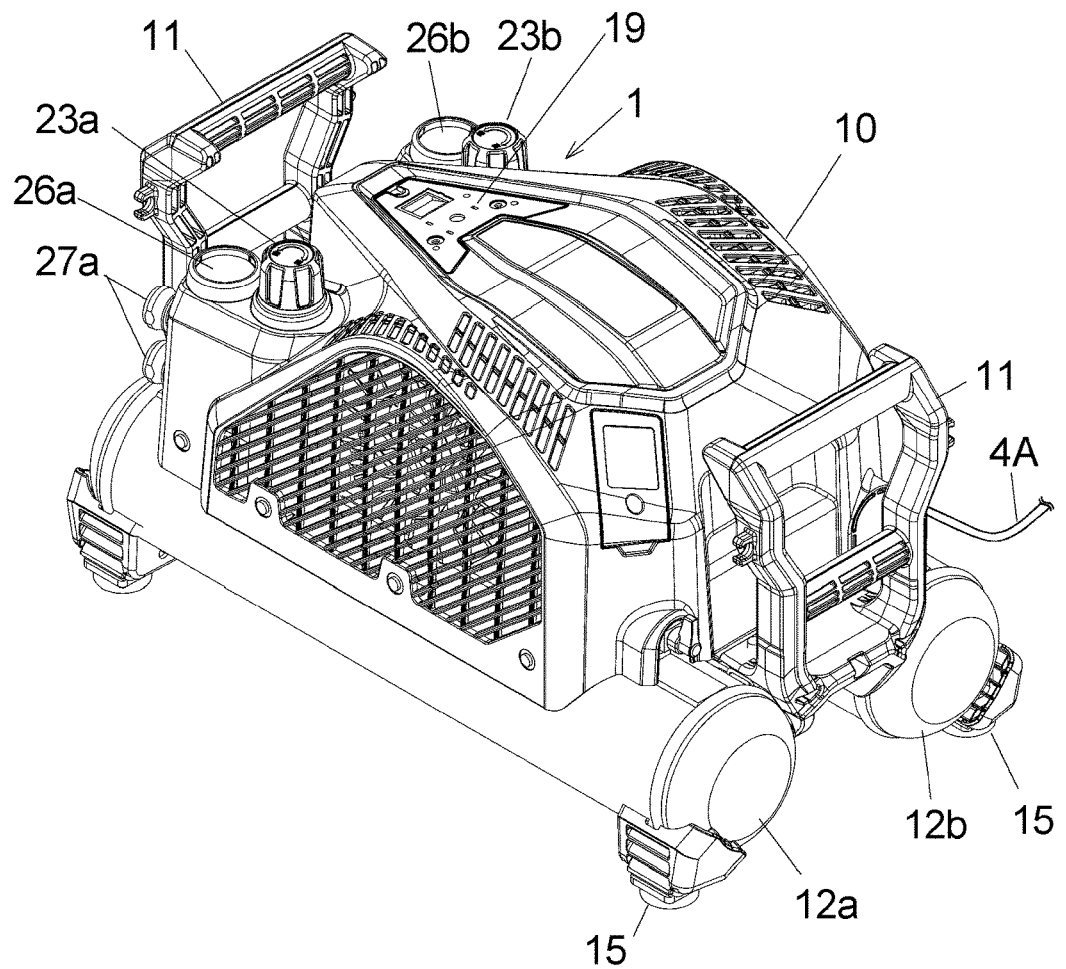
FIG. 10 is a perspective view illustrating the overall configuration of an air compressor which is a second embodiment of the work machine according to the present invention.
Figure 11:
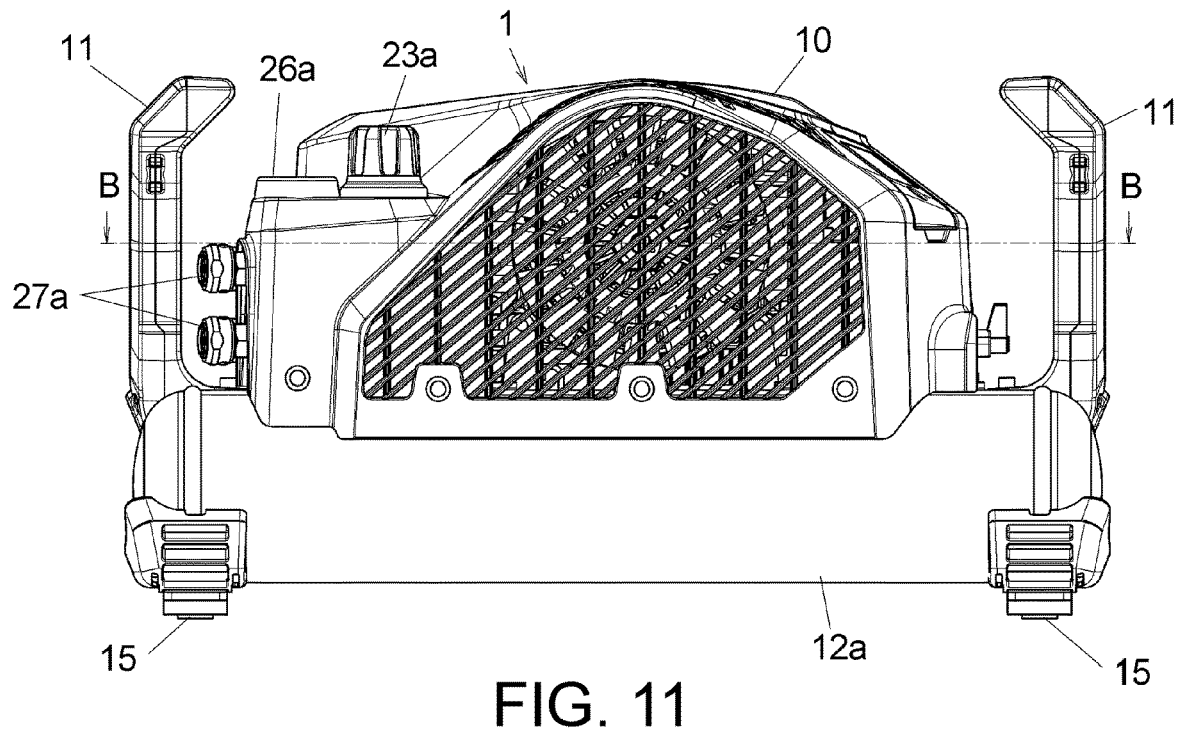
FIG. 11 is a front view of the same.
Figure 12:
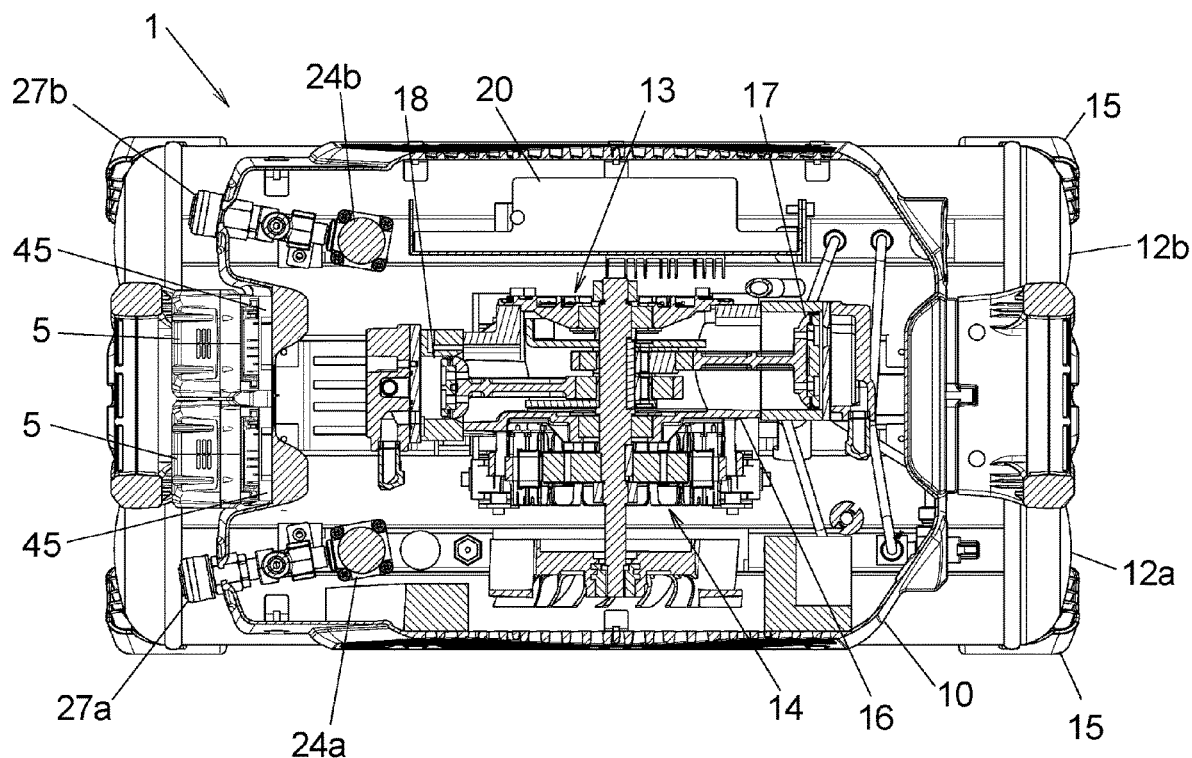
FIG. 12 is a plane cross-sectional view taken along line B-B in FIG. 11.
Figure 13:
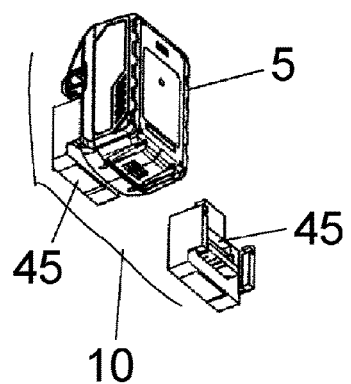
FIG. 13 is a perspective view illustrating a battery pack mounting portion provided on a main body cover of an air compressor.

In a second embodiment, FIG. 10 is a perspective view illustrating the overall configuration of an air compressor, FIG. 11 is a front view of the same, and FIG. 12 is a plane cross-sectional view taken along line B-B in FIG. 11. As illustrated in these diagrams, an air compressor 1 operates by a commercial AC power supply (AC power supply 100 V) and includes a power supply code 4A and a plug (not illustrated in the drawing) for connection to a plug socket of a commercial power supply. In addition, the air compressor 1 is capable of an assist operation using a battery power supply, and includes a plurality of battery pack mounting portions 45 on the outer surface of a main body cover (housing) 10 as illustrated in FIG. 13. A battery pack 5 serving as a DC power supply can be detachably attached to each of the battery pack mounting portions 45. In the case illustrated in the drawing, the battery pack 5 is mounted on one battery pack mounting portion 45.

The air compressor 1 includes a main body cover 10, a transporting handle 11 which is provided on both sides of the main body cover, a pair of air tanks 12a and 12b that are disposed in parallel and storing compressed air, a compression unit 13 (FIG. 12) that compresses air suctioned from the outside and supplies the compressed air to the air tanks 12a and 12b, and a motor 14 (FIG. 12) which is connected to the compression unit 13 and drives the compression unit 13. The motor 14 is, for example, a DC motor, and a rotation speed and the like of the motor 14 are controlled by controlling (for example, PWM control) an inverter unit 33, serving as a motor driving circuit in FIGS. 14A and FIG. 14B, which supplies power to the motor 14 by a main controller 40 (a control circuit such as a CPU is included). A user can perform operations such as turn-on/turn-off (ON/OFF) of the power supply of the air compressor 1, start-up and stopping of the motor, and switching of an operation mode by an operation panel unit (switch panel) 19. In addition, warnings such as the internal pressure of the air tanks and overload are displayed on the operation panel unit 19.

A configuration of the compression unit 13 is the same as that in the first embodiment, the compression unit 13 compresses air to an allowable maximum pressure of 3.0 to 4.5 MPa and supplies the compressed air to the air tanks 12a and 12b communicating with each other. The compressed air in the air tanks 12a and 12b is decompressed by decompression valves 24a and 24b and taken out to the outside via couplers 27a and 27b.

Figure 14A:
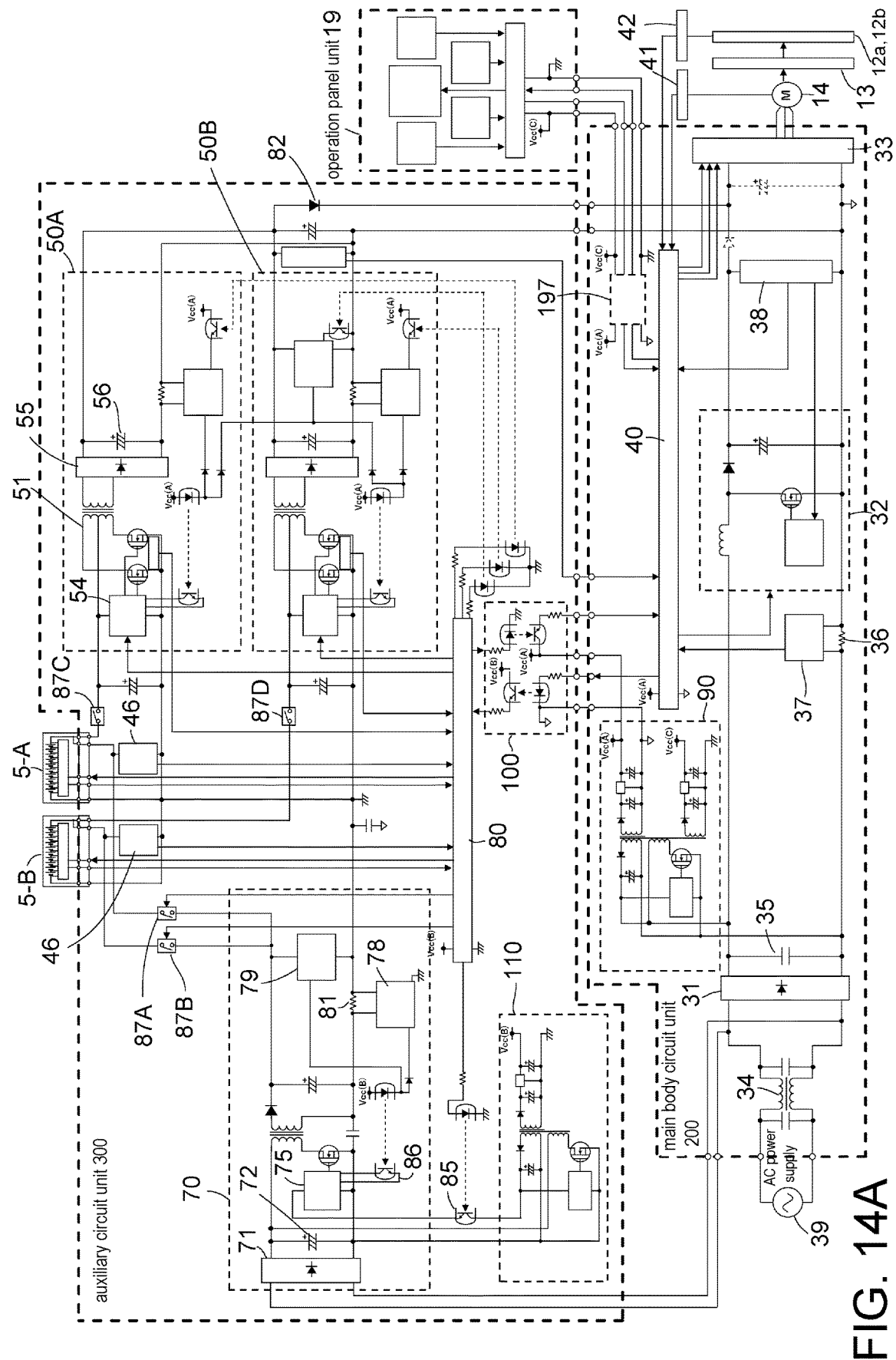
FIG. 14A is an overall circuit block diagram of the second embodiment.
Figure 14B:
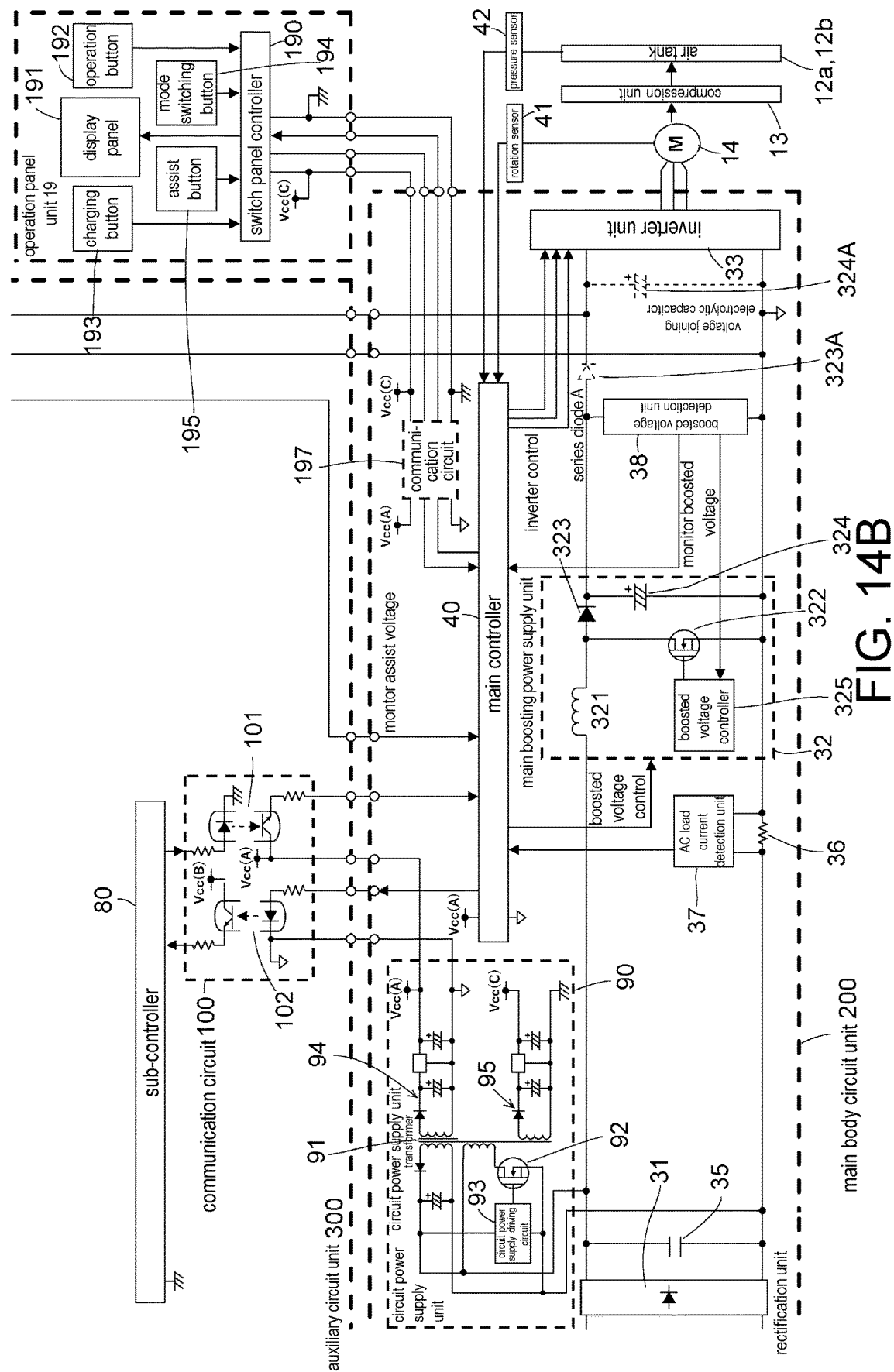
FIG. 14B is an enlarged circuit block diagram illustrating a main body circuit unit inherently included in the air compressor in the overall circuit block diagram.
Figure 14C:
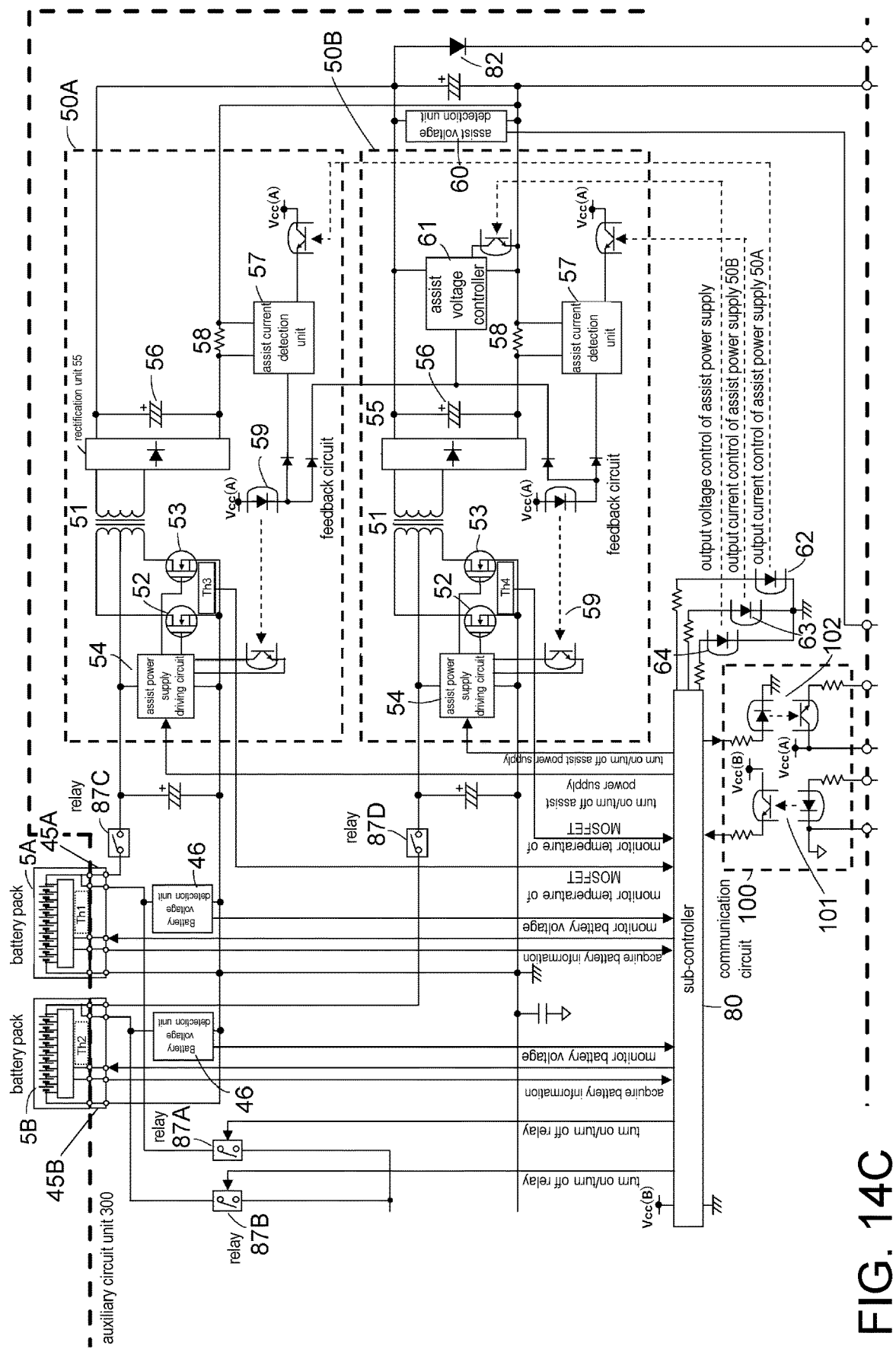
FIG. 14C is an enlarged circuit block diagram illustrating a portion including an assist power supply unit, the portion being an auxiliary circuit unit that performs power assist using a battery pack in the overall circuit block diagram.
Figure 14D:
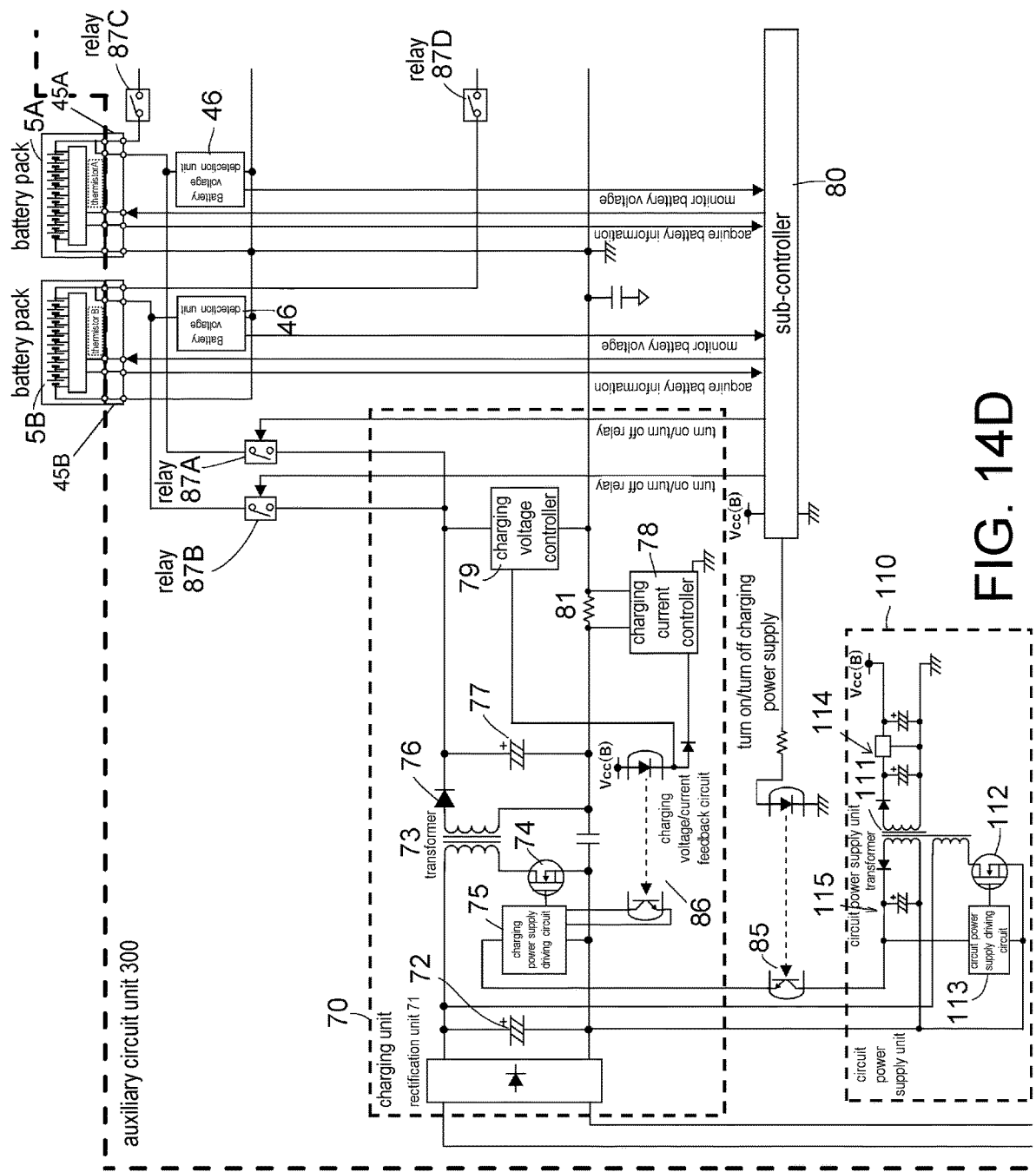
FIG. 14D is an enlarged circuit block diagram illustrating a portion including a charging unit in the auxiliary circuit unit.

FIG. 14A is an overall circuit block diagram of the air compressor 1, FIG. 14B is a circuit block diagram illustrating a main body circuit unit 200 which is inherently included in the air compressor 1 in the overall circuit block diagram, FIG. 14C is a circuit block diagram illustrating a portion including assist power supply units 50A and 50B in the overall circuit block diagram, the portion being an auxiliary circuit unit 300 that performs power assist using a battery pack, FIG. 14D is a circuit block diagram illustrating a portion including a charging unit 70 in the auxiliary circuit unit. As illustrated in the overall circuit configuration in FIG. 14A, the air compressor 1 includes the motor 14 for rotating the compression unit 13 to transmit compressed air into the air tanks 12a and 12b, and includes the main body circuit unit 200 for driving the motor 14 using a commercial AC power supply 39 which is an external AC power supply, and the auxiliary circuit unit 300 for power assist using a battery pack.

As illustrated in FIGS. 14A and 14B, the main body circuit unit 200 includes a rectification unit 31, a main boosting power supply unit 32, the inverter unit 33, and the main controller 40 for controlling the inverter unit 33 in order to drive the motor 14 by receiving power supplied from the commercial AC power supply 39 (AC 100V: for example, a maximum rated current of 15 A of a plug socket) which is an external AC power supply. A noise filter 34 is inserted between the commercial AC power supply 39 and the rectification unit 31, and a smoothing capacitor 35 is connected to a rectification output side of the rectification unit 31. AC power supplied from the AC power supply 39 is rectified by the rectification unit 31, and DC power smoothed by the smoothing capacitor 35 is supplied to the main boosting power supply unit 32. A current detection resistor 36 is inserted into a connection line between the rectification unit 31 and the main boosting power supply unit 32, and an AC load current detection unit 37 detects (monitors) an AC load current from voltage drops at both ends of the current detection resistor 36 and outputs an AC load current detection signal to the main controller 40. The main boosting power supply unit 32 includes a boosting circuit such as a DC-DC converter, DC power boosted here is supplied to the motor 14 via the inverter unit 33. The rectification unit 31, the main boosting power supply unit 32, and the smoothing capacitor 35 are examples of a second power supply unit.

The main boosting power supply unit 32 is a chopper type DC-DC converter including a choke coil 321, a switching element 322, a diode 323, and a capacitor 324 in the case illustrated in the drawing, and includes a boosted voltage controller 325 that controls a switching operation of the switching element 322. A boosted voltage detection unit 38 is provided on a boosting output side of the main boosting power supply unit 32.

A boosted voltage monitoring signal, a rotation detection signal of a rotation sensor 41 that detects the rotation of the motor 14, and a pressure detection signal of a pressure sensor 42 that detects the pressure of the air tanks 12a and 12b are input to the main controller 40 from the boosted voltage detection unit 38. The main controller 40 outputs a boosted voltage control signal to the main boosting power supply unit 32 (boosted voltage controller 325), outputs an inverter control signal to the inverter unit 33, and supplies DC power boosted by the main boosting power supply unit 32 to the motor 14 through the inverter unit 33 to change the amount of power supplied to the motor 14 by, for example, PWM control or the like and perform rotation control of the motor 14. The main controller 40 can set a target rotation speed of the motor 14 and controls the inverter unit 33 so that a rotation speed detected value of the rotation sensor 41 matches the target rotation speed. The compression unit 13 is rotated by the motor 14, and air discharged from the compression unit 13 is sent to the air tanks 12a and 12b.

The operation panel unit 19 includes a display panel 191 (warnings such as the internal pressure of the air tanks and overload are displayed), an operation button 192 for turning on or turning off (ON, OFF) the power supply, a charging button 193 for giving an instruction for charging a battery pack, a mode switching button 194 for giving an instruction for switching an operation mode, and an assist button 195 for giving an instruction for power assist using the battery pack 5, and is provided with a switch panel controller 190 in order to control these components. The switch panel controller 190 is connected to the main controller 40 via a communication circuit 197.

Note that a circuit power supply unit 90 is provided to supply a stabilized DC voltage to the main controller 40, the operation panel unit 19, the communication circuit 197, and the like. The circuit power supply unit 90 supplies a power supply voltage Vcc(A) to the main controller 40 and the like by using a DC output of the rectification unit 31 and supplies a power supply voltage Vcc(C) to the switch panel controller 190, the communication circuit 197, and the like. The circuit power supply unit 90 includes a step-down transformer 91 including one primary winding and two secondary windings, a switching element 92 that switches a primary side of the transformer, a circuit power supply driving circuit 93 that outputs a driving signal to the switching element 92, and rectifying and smoothing circuits 94 and 95 respectively provided for the two secondary windings. A DC output voltage of the rectifying and smoothing circuit 94 is supplied to the main controller 40 and the like as Vcc(A), and a DC output voltage of the rectifying and smoothing circuit 95 is supplied to the switch panel controller 190, the communication circuit 197, and the like as Vcc (C).

As illustrated in FIGS. 14A, 14C, and 14D, the auxiliary circuit unit 300 includes assist power supply units (first power supply units) 50A and 50B for performing driving assist of the motor 14 with a battery power supply (DC power supply), a charging unit 70 for charging the battery pack 5 serving as a battery power supply, a sub-controller 80, a circuit power supply unit 110, and a communication circuit 100. The sub-controller 80 is configured to include a control circuit such as a CPU, and controls the operations of the assist power supply units 50A and 50B and the charging unit 70 in association with the main controller 40. The circuit power supply unit 110 supplies a stabilized DC voltage to the sub-controller 80, the communication circuit 100, and the like. The communication circuit 100 constitutes an electrically isolated communication line between the main controller 40 and the sub-controller 80. The auxiliary circuit unit 300 is accommodated in, for example, an accommodation case portion 20 in the main body cover 10 in FIG. 12. In addition, the main controller 40 and the sub-controller 80 may be integrated as a single controller.

A battery pack 5-A is connected to a connection terminal 45A of one battery pack mounting portion 45, and a battery pack 5-B is connected to a connection terminal 45B of the other battery pack mounting portion 45. Battery voltage detection units 46 are respectively provided in the battery packs 5-A and 5-B in order to detect battery pack voltages of the battery packs 5-A and 5-B connected to the connection terminals 45A and 45B. Battery pack voltage detection signals from the battery voltage detection units 46 are supplied to the sub-controller 80. In addition, the sub-controller 80 receives battery information acquisition signals from the battery packs 5-A and 5-B to acquire battery information (battery temperature and the like) thereof. Since the assist power supply units 50A and 50B are respectively provided to correspond to the battery packs 5-A and 5-B, the capacities of the battery packs may not be the same.

The assist power supply unit 50A and the assist power supply unit 50B include a configuration of a boosting DC-DC converter as a boosting circuit, and both may have exactly the same circuit configuration. That is, the assist power supply units 50A and 50B include switching elements (for example, MOSFET) 52 and 53 push-pull connected to a primary side of the boosting transformer 51, assist power supply driving circuits 54 for alternately switching the switching elements 52 and 53, rectification units 55 connected to secondary sides of the boosting transformers 51, smoothing capacitors 56, and assist current controllers 57. A current detection resistor 58 is inserted into a connection line between the rectification unit 55 and the inverter unit 33. The assist current controller 57 detects (monitors) an assist current from voltage drop at both ends of the current detection resistor 58, receives output current control signals for the assist power supplies 50A and 50B from the sub-controller 80 via photocouplers 62 and 63, respectively, and feeds back an assist current control signal to the assist power supply driving circuit 54 via the photocoupler 59 as a feedback circuit. Here, the photocoupler 59 is used to electrically insulate the main body circuit unit 200 electrically connected to the AC power supply 39 and the auxiliary circuit unit 300 electrically connected to the battery pack 5 from each other, and a photocoupler is used in the following description for the same reason. The boosting transformer 51 is an example of a boosting circuit.

In the description of FIGS. 14A to 14D, for convenience of description, a case where DC power of the battery pack 5-A is supplied to the primary side of the boosting transformer 51 of the assist power supply unit 50A, and DC power of the battery pack 5-B is supplied to the primary side of the boosting transformer 51 of the assist power supply unit 50B is illustrated. Output sides of the rectification units 55 of the assist power supply units 50A and 50B are connected to each other in parallel, an assist voltage detection unit 60 is provided to detect output voltages of the assist power supply units 50A and 50B connected to each other in parallel, and an assist voltage controller 61 is provided to control the output voltages. DC output power of the assist power supply units 50A and 50B connected to each other in parallel is supplied to the inverter unit 33 via a series diode 82 (combined with DC output power of the main boosting power supply unit 32).

The sub-controller 80 outputs an output current control signal to the assist current controller 57 of the assist power supply unit 50A through the photocoupler 62, outputs an output current control signal to the assist current controller 57 of the assist power supply unit 50B through the photocoupler 63, and outputs an output voltage control signal, which is common to the assist power supply units 50A and 50B, to the assist voltage controller 61 via the photocoupler 64.

The output terminals of the assist power supply units 50A and 50B are connected to the output terminal of the main boosting power supply unit 32 in parallel through the diode 82. That is, the main boosting power supply unit 32 and the assist power supply units 50A and 50B are electrically connected to the motor 14 in parallel. The sub-controller 80 performs control so that an output voltage value of the assist power supply unit 50A and an output voltage value of the assist power supply unit 50B are equal to each other.

Specifically, the assist power supply units 50A and 50B can perform voltage variable control for increasing or decreasing a DC voltage at both ends of the smoothing capacitor 56 on an output side by receiving the output current control signal and the output voltage control signal from the sub-controller 80 to control the driving signal of the assist power supply driving circuit 54 and changing a duty at the time of alternately switching the switching elements 52 and 53. In other words, the assist power supply units 50A and 50B can drive the motor 14 by PAM control for increasing or decreasing a voltage to be supplied to the inverter unit 33. In addition, an assist power supply on/off signal is supplied from the sub-controller 80 to the assist power supply driving circuits 54 of the assist power supply units 50A and 50B. When the assist power supply on/off signal indicates "turn-on of the power supply", the assist power supply driving circuit 54 is operated to enable switching, and when the assist power supply on/off signal indicates "turn-off of the power supply", the operation of the assist power supply driving circuit 54 is stopped.

The charging unit 70 for charging the battery packs 5-A and 5-B mounted on the battery pack mounting portion 45 includes a configuration of a step-down DC-DC converter, and includes a rectification unit 71 that receives the supply of the AC power supply 39 through the noise filter 34, a smoothing capacitor 72, a step-down transformer 73, a switching element 74 that switches a primary side of the transformer, a charging power supply driving circuit 75 that performs on/off driving of the switching element 74, a diode 76 and a smoothing capacitor 77 serving as a rectifying and smoothing circuit that rectifies and smooths an output on a secondary side of the transformer 73, a charging current controller 78, and a charging voltage controller 79. A current detection resistor 81 is inserted into a connection line between the rectifying and smoothing circuit on the secondary side of the transformer 73 and the battery packs 5-A and 5-B, and the charging current controller 78 detects (monitors) a charging current from voltage drops at both ends of the current detection resistor 81. A charging current detection signal from the charging current controller 78 and a charging voltage control signal from the charging voltage controller 79 are fed back into the charging power supply driving circuit 75 via the photocoupler 86 as a feedback circuit.

The circuit power supply unit 110 supplies a power supply voltage Vcc(B) to the sub-controller 80 and the like by using a DC output of the rectification unit 71 of the charging unit 70 and supplies power to the photocoupler 85 that transmits a charging power supply on/off signal. The circuit power supply unit 110 includes a step-down transformer 111 including one primary winding and two secondary windings, a switching element 112 that switches the primary side of the transformer, a circuit power supply driving circuit 113 that outputs a driving signal to the switching element 112, and rectifying and smoothing circuits 114 and 115 that are provided in the two secondary windings, respectively. A DC output voltage of the rectifying and smoothing circuit 114 is supplied to the sub-controller 80, the photocoupler 86, and the like as Vcc(B), and a DC output voltage of the rectifying and smoothing circuit 115 is supplied to the photocoupler 85. The photocoupler 85 transmits the charging power supply on/off signal of the sub-controller 80 to the charging power supply driving circuit 75. When the charging power supply on/off signal indicates "charging power supply on", the charging power supply driving circuit 75 is operated to switch the switching element 74, and when the charging power supply on/off signal indicates "charging power supply off", the operation of the charging power supply driving circuit 75 is stopped.

A relay 87A is provided to turn on or turn off connection between the connection terminal 45A of one battery pack mounting portion 45 and the charging unit 70, and a relay 87B is provided to turn on or turn off connection between the connection terminal 45B of the other battery pack mounting portion 45 and the charging unit 70. In addition, a relay 87C is provided to turn on or turn off connection between the connection terminal 45A and the assist power supply unit 50A, and a relay 87D is provided to turn on or turn off connection between the connection terminal 45B and the assist power supply unit 50B. The turn-on or turn-off of each of the relays 87A to 87D is controlled with a relay on/off signal received from the sub-controller 80.

The communication circuit 100 includes two photocouplers 101 and 102, and constitutes an electrically insulated communication line between the main controller 40 and the sub-controller 80. The photocoupler 101 transmits an information signal received from the main controller 40 to the sub-controller 80, and the photocoupler 102 transmits an information signal received from the sub-controller 80 to the main controller 40.

The battery packs 5-A and 5-B are respectively provided with thermistors Th1 and Th2 for detecting the internal temperature. In addition, the switching elements 52 and 53 of the assist power supply units 50A and 50B are also respectively provided with thermistors Th3 and Th4 for temperature detection. Temperature monitoring signals of the thermistors Th1 to Th4 are output to the sub-controller 80, and operations of the battery pack and the assist power supply unit in which a rise in temperature exceeds an allowable range are stopped by the sub-controller 80.

In the operation panel unit 19 in FIG. 14B, the display panel 191 is a display unit that displays various information received from the main controller 40, the operation button 192 is a switch for giving an instruction for starting or stopping the operation of the air compressor 1, the charging button 193 is a switch for giving an instruction for permitting and stopping the charging of the battery pack 5, the mode switching button 194 is a switch for switching an operation mode (a normal operation, a silent operation, or the like) of the air compressor 1, the assist button 195 is a switch for switching between an assist mode in which power assist using the battery pack is also used and a single mode in which power assist is not used.

In the circuit configurations in FIGS. 14A to 14D, the air compressor 1 is used while connected to the commercial AC power supply 39 (AC 100 V), and the main body circuit unit 200 receives power supplied from the commercial AC power supply 39, and thus the air compressor 1 is controlled by the main controller 40 so that a current input from the commercial AC power supply 39 is set to equal to or less than 15 A, based on the value of the AC load current detection unit 37. This is because a maximum rated current of an AC plug socket is generally set to 15 A.

During a normal operation, the main controller 40 reduces a target rotation speed of the motor 14 when an AC load current value is about to exceed 15 A. A target rotation speed also changes depending on a load on the inverter unit 33 and pressure in the air tanks 12*a* and 12*b*. Specifically, the target rotation speed is set to be high in the case of a low load, and is set to be low in a case where the internal pressure of the tank increases and a case where the amount of used compressed air is large.

During power assist, an AC current value decreases when the target rotation speed is reached, and thus the main controller 40 can increase the target rotation speed to maintain the AC load current value of 15 A to thereby simply supply insufficient power from the battery pack 5. At this time, the sub-controller 80 can keep the rotation speed of the motor 14 within a fixed range by limiting a current or power to be supplied from the battery pack 5.

Here, the following points are noted. The main boosting power supply unit 32 performs feedback control so that a boosted voltage is set to be a target value. However, the main boosting power supply unit 32 performs control so as to lower the boosted voltage particularly in a case where an assist voltage from the assist power supply units 50A and 50B is excessively high when a series diode 323A indicated by a dashed line in FIG. 14B is not inserted. When the boosted voltage is lowered, a current to be supplied from the commercial AC power supply 39 decreases, and thus a current to be supplied from the battery pack 5 becomes excessive, resulting in a reduction in a power assist time. In this case, the series diode 323A can be omitted by controlling an assist voltage (output voltages of the assist power supply units 50A and 50B) to be as high as a forward voltage drop (1 V to 2 V) of the series diode 82.

On the other hand, in a case where the series diode 323A is inserted, it is necessary to provide a voltage joining electrolytic capacitor 324A, which is indicated by a dashed line, at a connection point between a boosted voltage and an assist voltage. This is to absorb surge energy generated in a case where the motor 14 is stopped, and a product having a large capacity and high withstand voltage has to be used. However, in a case where the series diode 323A is omitted as described above, an electrolytic capacitor 324 of the main boosting power supply unit 32 can be substituted, and thus the voltage joining electrolytic capacitor can also be omitted. Thereby, it is possible to reduce the area on the substrate and the cost of electronic components and to improve a reduction in efficiency due to a diode loss and a voltage drop.

Figure 15:
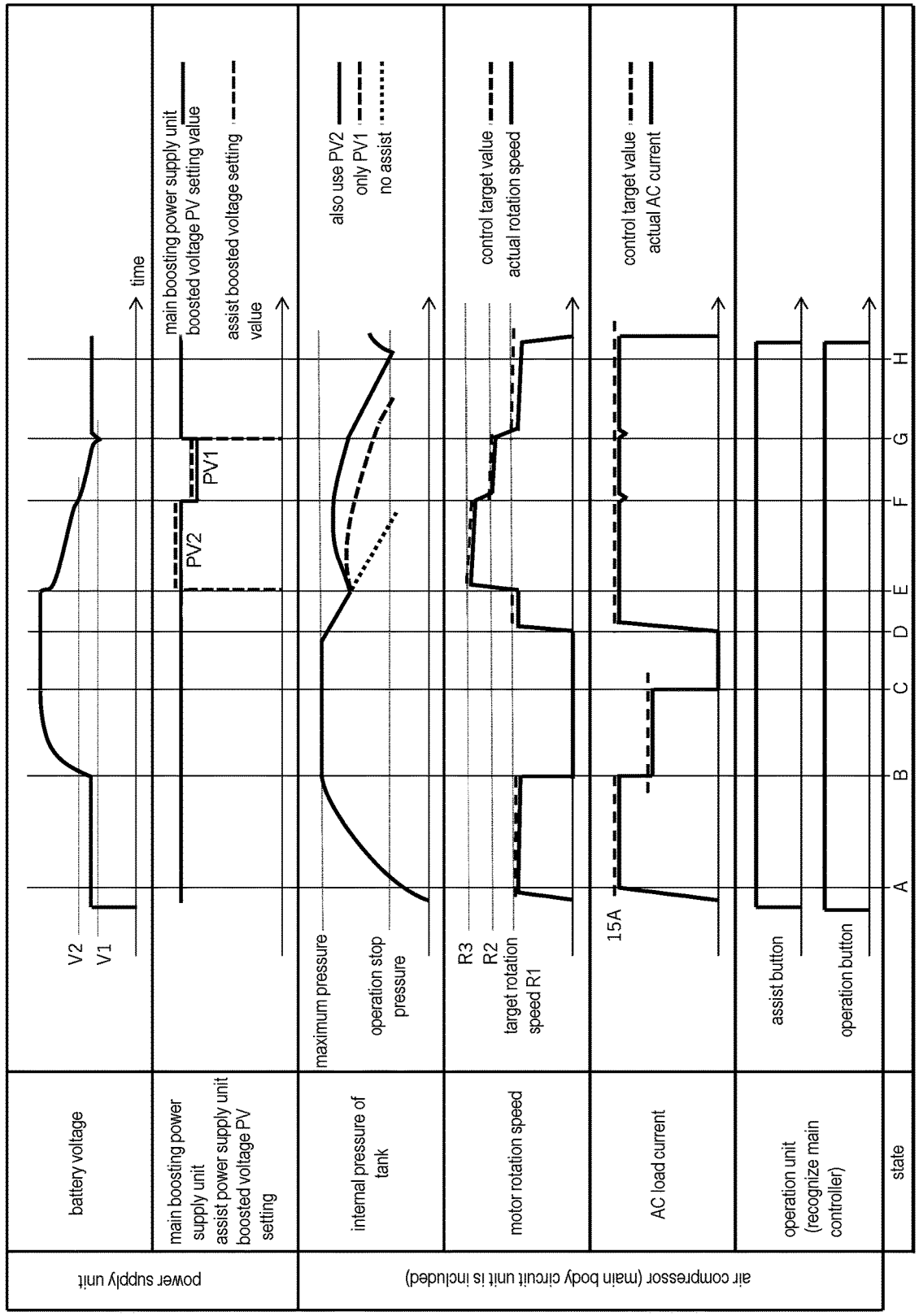
FIG. 15 is a time chart illustrating the operation of an air compressor according to a second embodiment.

Next, a representative example of control of the motor 14, the main body circuit unit 200, and the auxiliary circuit unit 300 in the air compressor 1 will be described using a time chart of FIG. 15. Here, "assist" indicates power assist using the battery pack 5. The amount of discharge is "the amount of air per unit time which can be compressed in the air tanks 12*a* and 12*b* by motor rotation". Here, for the sake of simplicity of description, a case where one battery pack 5 is mounted on the air compressor 1 or a case where a plurality of battery packs 5 having the same characteristics are mounted is described.

When an operator connects the air compressor 1 to the commercial AC power supply 39 and presses the operation button 192 on the operation panel unit (switch panel) 19, the internal pressure of the air tanks increases with the rotation of the motor 14 by motor control of the main controller 40 of the main body circuit unit 200. At this time, an initial target rotation speed setting value is R1. In addition, here, even if a battery pack voltage is sufficient (a voltage V2 or higher which is a first threshold value) and the assist button 195 is pressed, assist is not performed (however, switching can be performed depending on an operation mode).

State A: When an AC load current reaches approximately 15 A, the main controller 40 performs control to as to maintain a current immediately before the AC load current of 15 A while gradually lowering a motor rotation speed. In particular, as the internal pressure of the air tank rises, it becomes difficult to increase the pressure, and thus the actual motor rotation speed decreases.

State B: When the internal pressure of the air tanks reaches the maximum pressure, the main controller 40 stops the rotation of the motor. At this time, it is possible to start charging of the battery pack 5 with a free AC current by transmitting communication indicating being chargeable to the sub-controller 80 from the main controller 40.

State C: This is a state of waiting for the start of the operation of the air compressor 1 (restart of the motor due to a decrease in the internal pressure of the air tank). In addition, charging is stopped when charging of the battery pack 5 is completed or when the temperature of the battery pack rises (in the example illustrated in the drawing, charging is stopped when the charging of the battery pack 5 is completed).

State D: When the internal pressure of the air tank drops by a fixed amount, the main controller 40 rotates the motor 14 again. At this time, there is an attempt to increase the internal pressure of the air tanks by the rotation of the motor 14, but the pressure further decreases in a case where the amount of compressed air used by the operator is greater than the amount of discharge by the rotation of the motor.

State E: Regarding the internal pressure of the air tank, in a case where a certain amount of pressure drops or pressure drops with a certain amount of inclination or more, and the assist button 195 is pressed, the sub-controller 80 of the auxiliary circuit unit 300 starts assist by turning on the assist power supply units 50A and 50B (turning on relays 87C and 87D) through communication for starting assist from the main controller 40. At this time, in a case where a battery pack voltage is V2 or more, a boosted voltage setting value (second target value), which is an output voltage of the main boosting power supply unit 32, is set to PV2 (for example, 350 V). Setting values (first target values) of output voltages of the assist power supply units 50A and 50B are also set to a setting value (for example, 352 V) corresponding to PV2. In a case where a battery pack voltage is equal to or greater than V1 (second threshold value) and less than V2 (first threshold value), assist in which a setting value of a boosted voltage PV of the main boosting power supply unit 32 is set to PV1 is performed (in the example illustrated in the drawing, assist is performed with PV2). Since a large amount of discharge can be obtained in assist using the boosted voltage setting value PV2, the internal pressure of the air tank can be increased even when the amount of compressed air used by the operator is large. In addition, the main controller 40 sets a target rotation speed setting value to a target rotation speed setting value R3 at the same time when assist is started, and sets a boosted voltage setting value (second target value), which is an output voltage of the main boosting power supply unit 32, to PV2. However, the sub-controller 80 may set a first target value, which is the output voltage of each of the assist power supply units 50A and 50B, to be 1 to 2 V larger than the second target value PV2, which is the output voltage of the main boosting power supply unit 32 in consideration of the amount of voltage decreased due to the series diode 82. This is the same as when the second target value which is the output voltage of the main boosting power supply unit 32 is set to PV1. In addition, the sub-controller 80 may measure the actual voltage values of the output voltages of the assist power supply units 50A and 50B, and may determine the output voltages of the assist power supply units 50A and 50B by constant voltage control for feed-back controlling the boosting amounts of the assist power supply units 50A and 50B so that the actual voltage values match a target voltage value. In addition, the sub-controller 80 may measure the actual current values output from the assist power supply units 50A and 50B instead of a voltage value, and may determine output voltages of the assist power supply units 50A and 50B by constant current control for feed-back controlling the boosting amounts of the assist power supply units 50A and 50B so that the actual voltage values match a target value. In a case where the constant current control is performed, the output voltages of the assist power supply units 50A and 50B slightly fluctuate up and down due to the feed-back control, but the effective values of the output voltages are set to be the same value as the output voltage of the main boosting power supply unit 32 (or, the output voltages of the assist power supply units 50A and 50B are values 1 to 2 V larger than the output voltage of the main boosting power supply unit 32), and thus this is substantially the same meaning as when the sub-controller 80 controls the assist power supply units 50A and 50B so that the output voltages are set to the first target value.

State F: When a battery pack voltage decreases, the current consumption of the battery pack 5 increases, which accelerates a voltage drop, and a rise in the temperature of each part of the battery pack accelerates the stopping of assist. Further, it is difficult to maintain the boosted voltage setting value PV2 in a high-load state. Consequently, in a case where a battery pack voltage falls below V2, the sub-controller 80 communicates with the main controller 40 to lower the boosted voltage PV. Thereby, the main controller 40 sets the boosted voltage setting value of the main boosting power supply unit 32 to PV1 and sets a target rotation speed setting value to R2. Thereby, the amount of discharge is slightly smaller than the boosted voltage setting value PV2, but it is possible to achieve the extension of an assist time. At this time, the boosted voltage setting value PV1 and the target rotation speed setting value R2 to be set may be reduced stepwise (stepped shape), or may be decreased gradually.

State G: When the sub-controller 80 transmits communication regarding assist being not able to be performed due to a decrease in a battery pack voltage to the main controller 40, the main controller 40 sets a target rotation speed setting value of the motor 14 to R1 and transmits communication indicating that assist cannot be performed to the sub-controller 80. The sub-controller 80 turns off an assist power supply (turns off the relays 87C and 87D) to stop the assist. Here, even when the battery pack voltage is recovered and set to V1 or more, the assist is not started again. This is to suppress a rise in the temperature of the battery pack 5 and prioritize the recovery of the battery pack voltage by recharging.

State H: With the disappearance of assist, the internal pressure of the air tank decreases gradually due to the operator's use of compressed air. However, it is possible to maintain the internal pressure of the air tank which is higher than in a case where assist is performed with the boosted voltage setting value PV1 at all times, and consequently, it is possible to secure a long time to an operation stop pressure.

Figure 16:
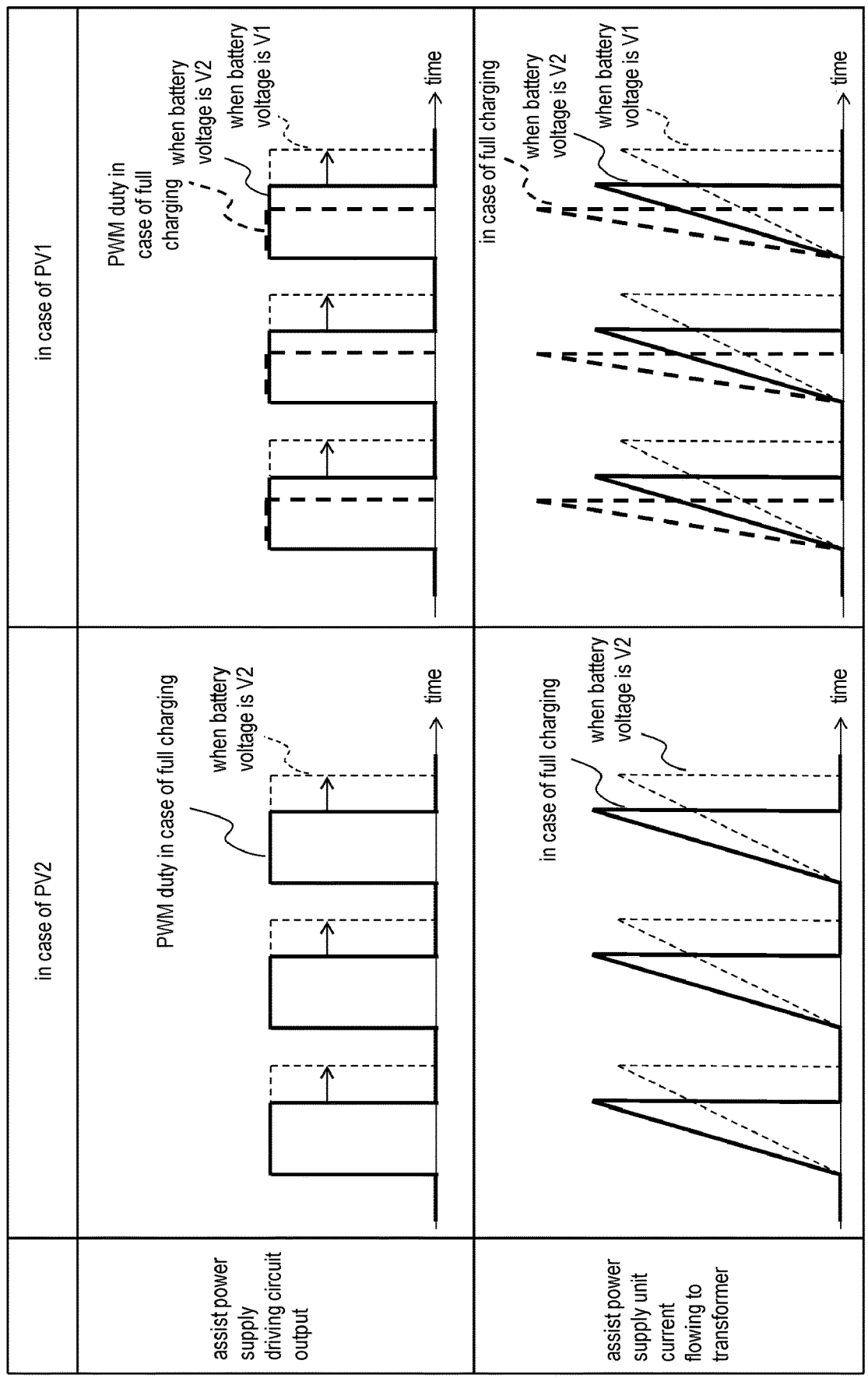
FIG. 16 is a waveform diagram illustrating a relationship between an output of an assist power supply unit driving circuit and a current flowing to an assist power supply unit transformer in a case where boosted voltage setting values (second target values), which are output voltages of a main boosting power supply unit 32, are PV1 and PV2.

Next, a waveform chart of FIG. 16 will be described. A battery pack for a power tool has a wide range of voltages that can be used, and thus in a case where there is an attempt to use a low voltage for assist (the transformers of the assist power supply units 50A and 50B are designed such that a duty of PWM control is maximized at a low battery pack voltage), the efficiency at the time of fully charging the battery pack inevitably deteriorates. In a case where a boosted voltage setting value is set to PV2 which is higher than PV1, a current flowing through the transformers 51 of the assist power supply units 50A and 50B does not become steep even in a fully charged state, and it is possible to maintain the boosted voltage value PV2 even when a battery pack voltage decreases to V2. However, when a battery pack voltage is less than V2, the duty of PWM control is maximized as soon as a load increases, and thus the boosted voltage setting value PV2 cannot be maintained. On the other hand, as a comparison operation, in a case where a boosted voltage setting value is fixedly set to PV1, and a boosted voltage setting value is set to PV1 even when the battery pack is fully charged, the duty of PWM control decreases as indicated by a thick dashed line, and a current flowing through the transformer 51 becomes steep. For this reason, there is a concern that a current value may increase due to current superimposition characteristics and that the efficiency may deteriorate due to an increase in a switching loss. Thus, the boosted voltage setting value PV2 is used from full charging to battery pack voltage V2, and the boosted voltage setting value is set to PV1 after the battery pack voltage is set to be less than V2, and thus it is possible to maintain assist with a duty in high PWM control. Consequently, it is possible to perform assist with high efficiency for a long period of time in a wide range of a battery pack voltage. Note that, when the battery pack voltage decreases below V2 in a high-load state, an assist voltage decreases below PV2 in a state where the duty of PWM control is maximized, and thus the boosted voltage setting value may be linearly and gradually reduced in accordance with the battery pack voltage instead of decreasing the boosted voltage setting value from PV2 to PV1 stepwise in one step.

Figure 17:
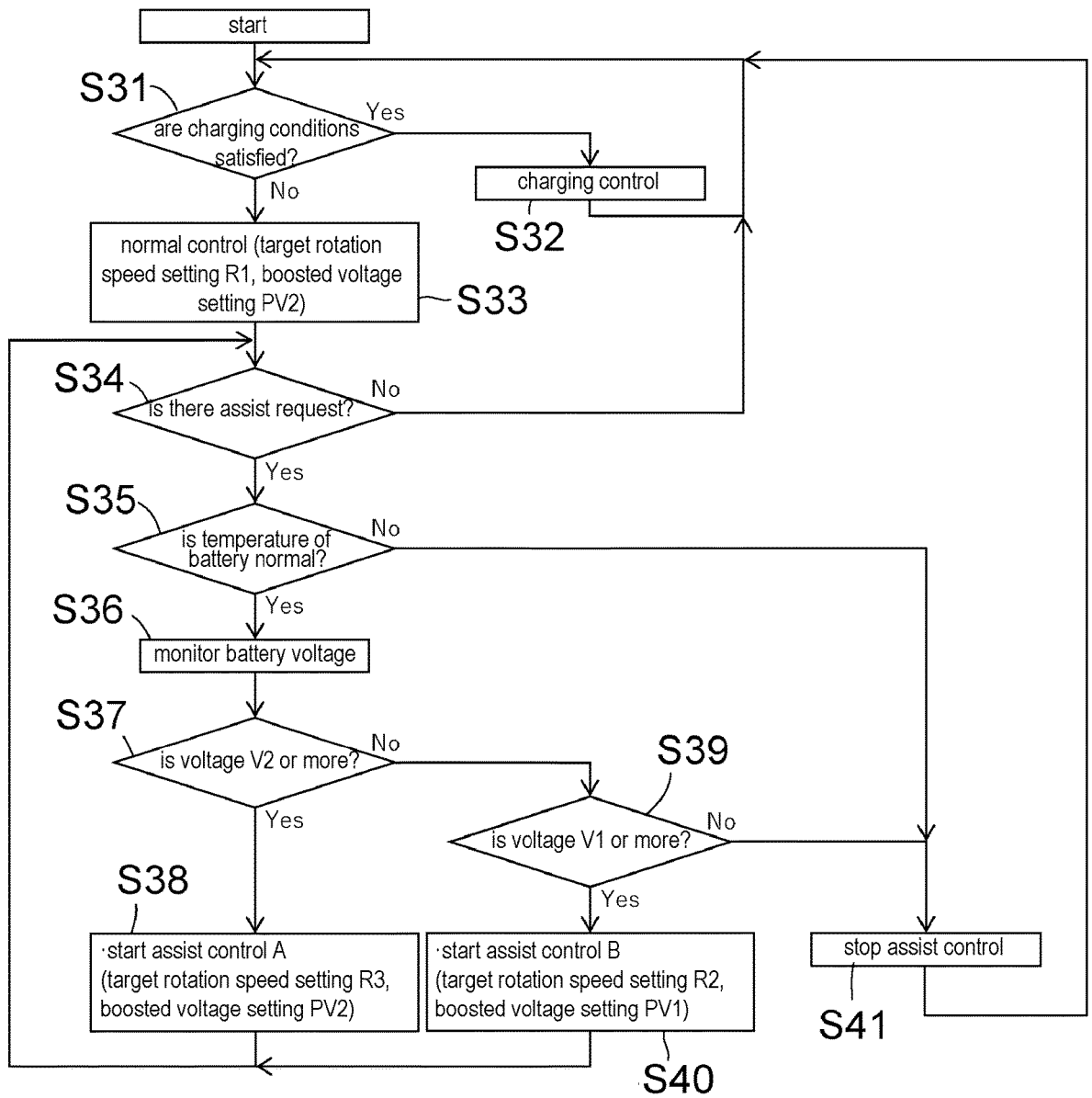
FIG. 17 is a flowchart illustrating the operation of the second embodiment.

FIG. 17 illustrates an operation flowchart related to the circuit block diagram in FIG. 14A (in the drawing, a battery pack may be abbreviated as a "battery"). At the start, the power supply of the air compressor 1 is turned on, power supply voltages Vcc(A), Vcc(B), and Vcc(C) are respectively supplied to the main controller 40, the sub-controller 80, the operation panel unit 19, and the like from the circuit power supply units 90 and 110, and a standby state is set.

In step S31, the main controller 40 and the sub-controller 80 determine whether or not charging conditions for the battery pack 5 are satisfied. Examples of the charging conditions include (1) a case where the motor 14 of the air compressor 1 is not driven (an AC current is not used), the temperature of the battery pack is not high (does not exceed a temperature threshold value), and a battery pack voltage is not fully charged, and (2) a case where the battery pack can be charged with a surplus current and a battery pack voltage is not fully charged under driving conditions in which the internal pressure of the air tank is boosted by controlling an AC load current to 15 A or less such as an operation mode being a silent mode.

When a determination result in step S31 is Yes, charging control is performed in step S32. That is, the relays 87A and 87B in FIGS. 14A and 14D are turned on by the sub-controller 80 to perform charging of the battery pack 5 by the charging unit 70. The charging current controller 78 and the charging voltage controller 79 detect a current and a voltage of the battery pack 5 and stop charging after the battery pack 5 is fully charged, and the operation returns to step S31.

When a determination result in step S31 is No, normal control is performed by the main controller 40 and the sub-controller 80 in step S33. That is, the main controller 40 and the sub-controller 80 perform control with a target rotation speed setting value R1 of the motor 14 and a boosted voltage setting value PV2 of the main boosting power supply unit 32. The main controller 40 increases the internal pressure of the air tank to a predetermined maximum pressure while controlling the motor 14 at a constant rotation speed so that the target rotation speed setting value R1 is set. In addition, the output voltage setting values of the assist power supply units 50A and 50B are set to be a setting value corresponding to PV2, but at this point, the assist power supply units 50A and 50B are stopped.

Next, in step S34, it is determined whether or not there is an assist request. Here, the assist request indicates that an assist request signal is transmitted from the main controller 40 to the sub-controller 80 in a case where an AC load current reaches approximately 15 A, the internal pressure of the air tank does not reach a specified value, and the assist button 195 is pressed. When a determination result in step S34 is No, that is, there is no assist request, the operation returns to step S31.

When "there is an assist request", and a determination result in step S34 is Yes, it is determined in step S35 whether or not the temperature of the battery pack 5 is normal. This determination is performed by monitoring temperature monitoring signals of the thermistors Th1 and Th2, which are respectively provided in the battery packs 5-1 and 5-2, by the sub-controller 80. When the temperature of the battery pack exceeds a threshold value and indicates abnormality, a determination result in step S35 is No, the assist control is stopped (the relays 87C and 87D are turned off by the sub-controller 80) in step S41, and the operation returns to step S31.

When the temperature of the battery pack is normal, and a determination result in step S35 is Yes, a battery pack voltage is monitored by the sub-controller 80 in step S36. Then, in step S37, it is determined whether or not the battery pack voltage is a voltage V2 or more. In a case where the battery pack voltage is a voltage V2 or more, and a determination result in step S37 is Yes, assist control A is started in step S38. In other words, the sub-controller 80 transmits a control condition (assist control A) to the main controller 40 as a signal indicating that assist control can be performed, and the assist control of the air compressor 1 is started with a target rotation speed setting value R3 and a boosted voltage setting value PV2 of the motor 14. In this case, although it depends on operation mode setting, the assist control is started after the operator starts using compressed air after the internal pressure of the air tank once increases to a specified pressure after the power supply is turned on. As a method of determining the use of compressed air, it is determined that the compressed air has been used in a case where it is detected that the internal pressure of the air tank has decreased by a fixed amount or has decreased at a fixed inclination or more.

In a case where the battery pack voltage is less than a voltage V2, and a determination result in step S37 is No, it is determined in step S39 whether the battery pack voltage is a voltage V1 (where V1<V2) or more. In a case where the battery pack voltage is a voltage V1 or more, and a determination result in step S39 is Yes, assist control B is started in step S40. That is, the sub-controller 80 transmits a control condition (assist control B) to the main controller 40 as a signal indicating that assist control can be performed, and the assist control is started with a target rotation speed setting value R2 (where R2<R3) and a boosted voltage setting value PV1 (where PV1<PV2) of the motor 14.

In a case where the battery pack voltage is less than a voltage V1, and a determination result in step S39 is No, the assist control is stopped in step S41, and the operation returns to step S31.

Note that, in step S38 or step S40, the sub-controller 80 may simply transmit the battery pack voltage to the main controller 40, and the main controller 40 may perform control according to the control condition A or B. In either case, in the assist control A, the sub-controller 80 performs control so that an assist voltage is set to be a voltage slightly higher than the boosted voltage setting value PV2, and feedback control is performed by the assist current controller 57 and a current detection circuit included in the assist power supply driving circuit 54 so that an appropriate assist amount is set.

At this time, when assist is performed such that an input-side current value (a current supplied from the battery pack 5) is fixed, it is possible to suppress a reduction in an assist time and a rise in the temperature of the battery pack due to a sudden increase in a consumed even when the battery pack voltage has decreased. On the other hand, when assist is performed by setting fixed output-side power (that is, a fixed product of an assist voltage and an assist current), it is possible to perform assist for maintaining the internal pressure of the air tank while preventing the internal pressure from decreasing. Naturally, a current and power limited by the boosted voltage setting values PV2 and PV1 may be changed.

When the assist request disappears or the battery pack voltage decreases below V1, the assist is stopped in step S41, and the operation proceeds to normal control. At this time, the target rotation speed setting value of the motor 14 is returned to the original R1, and the boosted voltage setting value of the main boosting power supply unit 32 is returned to PV2. Since the rotation speed during assist is higher than that in a normal case, there is a possibility that an AC current will overshoot at the same time as when the assist is stopped, in a case where the target rotation speed setting value is not decreased. On the other hand, even when the battery pack voltage is recovered to V1 or more by stopping the assist, the battery that has once fallen below V1 is not subjected to assist if the battery is not recovered to V2 or higher again.

In addition, as a premise, it is assumed that characteristics of the motor 14 (power efficiency, and the like) are optimized at a voltage PV2 because the motor is normally operated with only an AC current (a case where assist cannot be performed due to an insufficient battery pack voltage is also included). At this time, when the battery pack voltage decreases, it is necessary to perform design for obtaining the effect of assist even when the voltage is lowered to a voltage PV1 (the design of the choke coils included in the transformers 51 of the assist power supply units 50A and 50B and the rectification unit 55, the selection of the voltage V1 and the voltage PV1).

When a duty of PWM control of the assist power supply driving circuit 54 that drives the switching elements (for example, MOSFET) 52 and 53 is maximized in a case where the battery pack voltage decreases or a motor load current is extremely large after the assist control A is started in step S38, an assist voltage (for example, PV2+2 V) cannot be maintained and decreases. At this time, since the main boosting power supply unit 32 maintains the boosted voltage setting value (for example, PV2), a current supplied from the assist power supply units 50A and 50B decreases instantaneously, and thus the assist voltage increases again. By repeating this, a stable assist operation can be performed without imposing current limitation. In other words, under this condition, the boosted voltage setting value is gradually decreased from PV2 with a decrease from the battery pack voltage V2, and thus it is possible to perform assist with high efficiency while maintaining a state where the duty of PWM control is maximized. Thus, in a case where the boosted voltage setting value is changed from PV2 to PV1, the boosted voltage setting value may be changed linearly in this manner.

In a case where two battery packs 5 are mounted on the air compressor 1, that is, in a case where the battery packs 5-A and 5-B are connected to the auxiliary circuit unit 300, and both the battery pack voltages thereof are V2 or more, the battery packs may be used for assist at the same time. In this case, the assist for both is stopped when either voltage falls below V1 or reaches a threshold temperature. However, in a case where a potential difference between both the battery packs is large or a case where battery packs having different capacities are used, the battery pack of which the battery pack voltage does not fall below V1 may be used for assist again when there is no problem with a voltage or temperature after assist has stopped. Further, in a case where one battery pack voltage has not reached V2 at a point in time when an assist request has been made, control may be performed such that assist is started in only the other battery pack of which the voltage is V2 or more.

According to the second embodiment, the following effects can be achieved.

(1) The air compressor 1 includes the assist power supply units 50A and 50B serving as a first power supply unit that boosts an output voltage of the battery pack 5 as a DC power supply and outputs the boosted voltage to the motor 14, a second power supply unit (a circuit configuration including the rectification unit 31 and the main boosting power supply unit 32) which is electrically connected to the motor 14 in parallel together with the assist power supply units 50A and 50B, boosts the voltage of the external AC power supply 39, and outputs the boosted voltage to the motor 14, a controller (the main controller 40, the sub-controller 80) which controls output voltages of the assist power supply units 50A and 50B and the main boosting power supply unit 32, and a detection circuit (including the AC load current detection unit 37, the boosted voltage detection unit 38, the battery voltage detection unit 46, the assist current controller 57, and the assist voltage detection unit 60) which detects the state of power flowing through the assist power supply units 50A and 50B and the second power supply unit. The controllers 40 and 80 set a first target value and a second target value so that power output from the assist power supply units 50A and 50B and power output from the main boosting power supply unit 32 are combined and supplied to the motor 14, the first target value being a target value of output voltages of the assist power supply units 50A and 50B, the second target value being a target value of an output voltage of the main boosting power supply unit 32. In addition, the controllers 40 and 80 can improve (increase compressed air pressure) the output of the air compressor 1 while suppressing a load on the battery pack 5 by changing the first target value and the second target value in accordance with detected values of the detection circuit.

(2) The battery voltage detection unit 46 detects an output voltage of the battery pack 5. The controllers 40 and 80 make the first target value and the second target value smaller when the output voltage of the battery pack 5 is less than a first threshold value (for example, V2) than when the output voltage of the battery pack 5 is equal to or greater than the first threshold value. Thereby, it is possible to extend a power assist period of the battery pack 5. In addition, the controllers 40 and 80 may decrease the second target value linearly or stepwise in accordance with a decrease in the output voltages of the assist power supply units 50A and 50B.

(3) The controllers 40 and 80 stop the outputs of the assist power supply units 50A and 50B when the output voltage of the battery pack 5 is less than the second threshold value (for example, V1) which is smaller than the first threshold value. Thereby, it is possible to suppress a rise in the temperature of the battery pack 5 and prioritize the recovery of the battery pack voltage by recharging.

(4) The controllers 40 and 80 set the first target value larger than the second target value, and perform control such that a difference between the first target value and the second target value is less than a predetermined value (1 V to 2 V). Thereby, it is possible to eliminate or reduce the influence of a forward voltage drop of the series diode 82 for electrically connecting the output sides of the assist power supply units 50A and 50B to the output side of the main boosting power supply unit 32 in parallel.

(5) The controllers 40 and 80 can set a target rotation speed of the motor 14, and the detection circuit (the AC load current detection unit 37, the assist current controller 57) detects output currents of the commercial AC power supply 39 and the assist power supply units 50A and 50B, and the controllers 40 and 80 set the first target value such that a difference from the second target value is less than a predetermined value at the time of setting the target rotation speed higher than the rotation speed of the motor 14 when the output current of the commercial AC power supply 39 is set to be a predetermined value (for example, a value which is slightly below 15 A) to make it possible to perform power assist by the assist power supply units 50A and 50B and suppress the output current of the commercial AC power supply 39 to a predetermined value or less. In addition, when the target rotation speed is set to be lower than the rotation speed of the motor 14 when the output current of the commercial AC power supply 39 is set to be the predetermined value, the outputs of the assist power supply units 50A and 50B are stopped, and thus it is possible to prevent the consumption of the battery pack 5.

Note that a portion or the entirety of the above-described second embodiment can be described as the following additions, but is not limited to the following.

(Addition 1) A work machine including:

a motor;

a first power supply unit connected to a DC power supply, boosting an output voltage of the DC power supply, and outputting the boosted output voltage to the motor;

a second power supply unit electrically connected to the motor in parallel together with the first power supply unit, connected to an external AC power supply, boosting an output voltage of the AC power supply, and outputting the boosted output voltage to the motor;

a controller controlling output voltages of the first power supply unit and the second power supply unit; and a detection circuit detecting the state of power flowing through the first power supply unit and the second power supply unit, wherein the controller sets a first target value and a second target value so that power output from the first power supply unit and power output from the second power supply unit are combined and supplied to the motor, the first target value being a target value of the output voltage of the first power supply unit, the second target value being a target value of the output voltage of the second power supply unit, and the controller changes the first target value and the second target value in accordance with a detected value of the detection circuit.

(Addition 2) The work machine according to addition 1, wherein the detection circuit detects the output voltage of the DC power supply, and the controller decreases the first target value and the second target value more when the output voltage of the DC power supply is less than a first threshold value than when the output voltage of the DC power supply is equal to or greater than the first threshold value.

(Addition 3) The work machine according to addition 2, wherein the controller stops the output of the first power supply unit when the output voltage of the DC power supply is less than a second threshold value which is smaller than the first threshold value.

(Addition 4) The work machine according to addition 2 or 3, wherein the controller decreases the first target value and the second target value stepwise in accordance with a decrease in the output voltage of the DC power supply.

(Addition 5) The work machine according to any one of additions 1 to 4, wherein the controller sets the second target value so that a difference from the first target value is less than a predetermined value.

(Addition 6) The work machine according to addition 5, wherein the controller sets the first target value to be larger than the second target value.

(Addition 7) The work machine according to addition 5 or 6, wherein the controller is able to set a target rotation speed of the motor, the detection circuit detects output currents of the AC power supply and the DC power supply, and the controller sets the first target value so that a difference from the second target value is less than a predetermined value at the time of setting the target rotation speed to be higher than the rotation speed of the motor when the output current of the AC power supply is set to be a predetermined value, and stops the output of the first power supply unit at the time of setting the target rotation speed to be lower than the rotation speed of the motor when the output current of the AC power supply is set to be the predetermined value.

(Addition 8) The work machine according to any one of additions 1 to 7, wherein the first power supply unit includes a boosting transformer and a switching element provided on a primary side of the boosting transformer, and the controller controls the output voltage of the first power supply unit through switching control of the switching element.

(Addition 9) The work machine according to any one of additions 1 to 8, wherein the detection circuit detects the output voltage of the AC power supply, and the controller makes the first target value and the second target value smaller when the output voltage of the AC power supply is less than a third threshold value than when the output voltage of the AC power supply is equal to or greater than the third threshold value.

Third Embodiment

Figure 18:
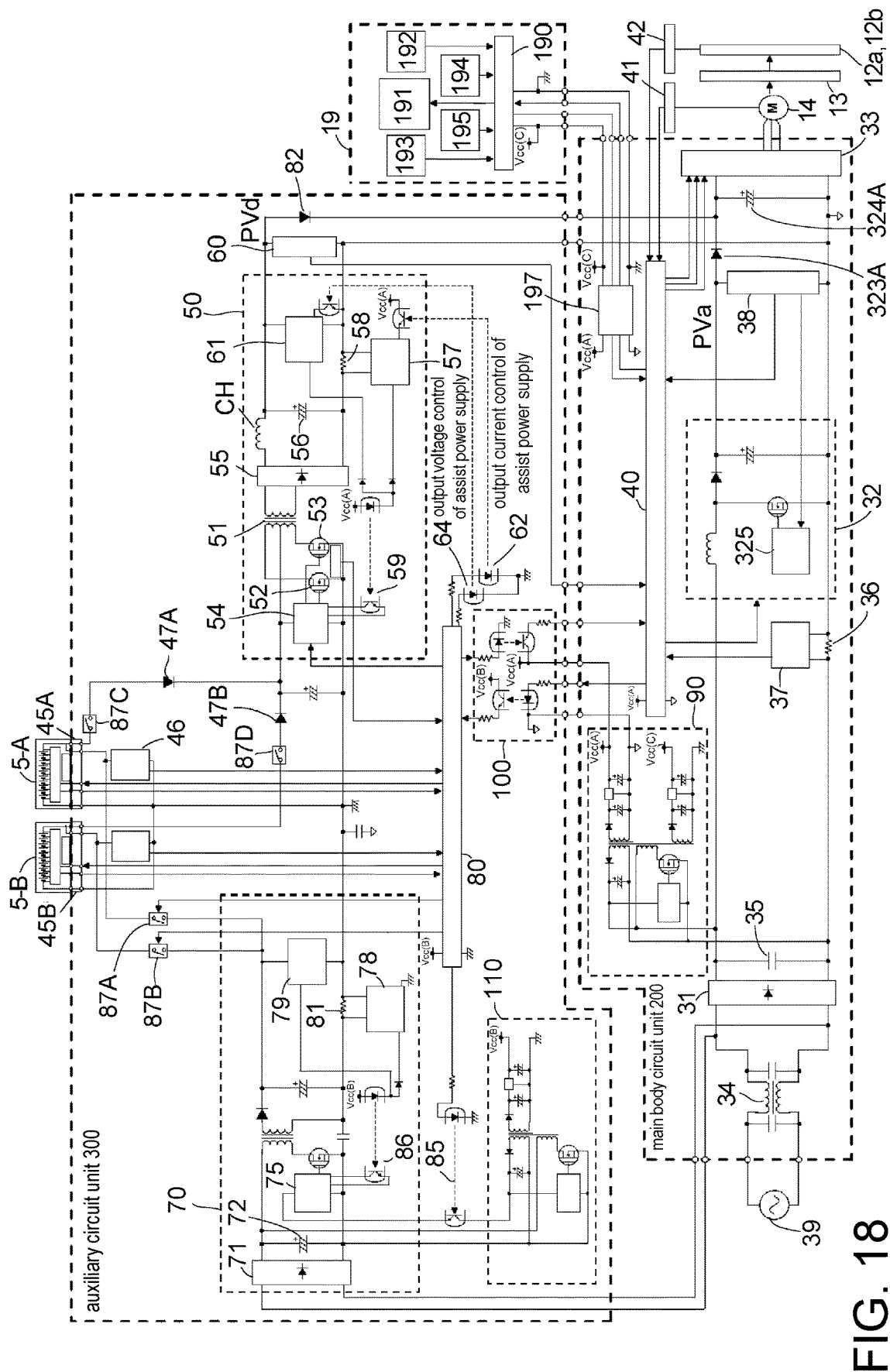
FIG. 18 is an overall circuit block diagram of a third embodiment.

FIG. 18 is an overall circuit block diagram of a third embodiment. The present embodiment is different from FIG. 14 according to the second embodiment in that output voltages of battery packs 5-A and 5-B are supplied to one assist power supply unit 50 (first power supply unit) through series diodes 47A and 47B, a smoothing choke coil CH is provided on an output side of a rectification unit 55 of the assist power supply unit 50, and a series diode 323A and a voltage joining electrolytic capacitor 324A are provided on an output side of a main boosting power supply unit 32 on a second power supply unit side, and the other configurations are the same as those in FIG. 14A. With a configuration in which the output voltages of the battery packs 5-A and 5-B are supplied to one assist power supply unit 50 through the series diodes 47A and 47B, it is possible to prevent a current from flowing from one battery pack to the other due to a potential difference between the battery packs, and thus it is not necessary to provide an assist power supply unit for each battery pack. A smoothing choke coil CH is provided on an output side of the rectification unit 55 of the assist power supply unit 50 to constitute a choke input type smoothing circuit by the choke coil CH and the capacitor 56, and thus the pulsation of the output voltage of the assist power supply unit 50 can be reduced even when the duties of the switching elements 52 and 53 are small. In a case where an output voltage higher than in the second embodiment is set, a voltage is applied to the capacitor 56 through the choke coil CH, which is advantageous in terms of the withstand voltage of the capacitor 56 (the withstand voltage can be set to be lower than when there is no choke coil). By providing the series diode 323A and the voltage joining electrolytic capacitor 324A on the output side of the main boosting power supply unit 32, a voltage value detected by a boosted voltage detection unit 38 is no longer affected by the output voltage of the assist power supply unit 50.

FIG. 19 is a diagram illustrating a relationship between target voltages of an output voltage (DC-side boosted voltage PVd) of the assist power supply unit 50 serving as a DC-side power supply boosting circuit and an output voltage (AC-side boosted voltage PVa) of the main boosting power supply unit 32 serving as an AC-side power supply boosting circuit, and effective currents of a DC-side current consumption and an AC-side power supply current consumption. In the drawing, the DC-side current consumption is an output current of the assist power supply unit 50 which is supplied to an inverter unit 33 through a series diode 82 (which is not an output current of the battery pack). The AC-side power supply current consumption is an output current of the main boosting power supply unit 32 which is supplied to the inverter unit 33 through the series diode 323A.

In FIG. 18, a current consumed by the motor 14 is equal to the sum of the current consumptions of the main boosting power supply unit 32 and the assist power supply unit 50. In particular, in FIG. 19(1), when an AC-side boosted voltage (DC voltage PVa: the output voltage of the main boosting power supply unit 32) and a DC-side boosted voltage (DC voltage PVd: the output voltage of the assist power supply unit 50) are equal to each other, current consumptions of respective circuits are equal to each other. Strictly speaking, a current balance varies every moment due to a peak current flowing through the motor 14, a superimposed AC ripple current, a difference in circuit impedance, or the like, and thus they are assumed to be substantially equal in terms of an effective current here.

Further, in a case where a boosted voltage is adjusted so that PVd>PVa, the distribution (current balance) of the current consumptions of the main boosting power supply unit 32 and the assist power supply unit 50 in the motor current can be changed according to a potential difference between PVd and PVa. Although it depends on a boosted voltage level, a forward voltage drop VF of the series diodes 82 and 323A, and the current consumption of the motor, a potential difference that allows the current balance to be adjusted is approximately less than 5 V {FIG. 19(2)}. In a case where the potential difference is equal to or greater than 5 V and assist power supply output current control is not performed, for example, in a case where a voltage is generated such that a boosted voltage in FIG. 19(3) satisfies a relationship of PVd−PVa>5 V, most of a current consumed by the motor 14 is PVd, that is, supplied from the assist power supply unit 50. Specifically, in a case where a motor current consumption is set to 6 A, each power supply boosting circuit supplies a current of 3 A each time when PVd=PVa, but current imbalance gradually accelerates to 6 A and 0 A as the potential difference between PVd and PVa increases.

At this time, a voltage feedback value may be set such that PVd−PVa<5 V, or PVd may be arbitrarily changed to adjust the current consumption distribution. However, as described above, since a current balance changes every moment, and it is difficult to maintain an arbitrary current distribution as effective current, it is preferable to limit a current by current feedback by setting the value of voltage feedback to be the former (PVd−PVa<5 V). Thus, a current feedback circuit (assist current controller 57) is also provided in the assist power supply unit 50 serving as a DC-side power supply boosting circuit, and output current control is performed with an output current control signal for an assist power supply of a sub-controller 80. In a case where a motor current consumption is 6 A and a current limitation value of the assist power supply unit 50 is 3 A, it is possible to maintain a current balance in which the current consumption of the assist power supply unit 50 is 3 A, and the current consumption of the main boosting power supply unit 32 is 3 A even when PVd−PVa>5 V. Thus, a voltage feedback circuit for voltage control and a current feedback circuit for current control are incorporated into the assist power supply unit 50, which leads to a configuration in which it is possible to indirectly extract any power from the battery packs 5. Specifically, in a case where an output power of 750 W is desired to be extracted from the battery packs 5, PVd may be set to 375 V, and a current consumption may be set to 2 A as illustrated in FIG. 19(4). As a setting method, predetermined resistance voltage division or a shunt regulator may be used, but as illustrated in FIG. 18, an assist voltage controller 61 using a photocoupler and an assist current controller 57 may be used to arbitrarily adjust a circuit parameter on a secondary side of a transformer 51.

On the other hand, regarding the main boosting power supply unit 32 serving as an AC-side power supply boosting circuit, voltage control with fixed PVa is performed by applying a boosted voltage control signal received from the main controller 40 to the boosted voltage controller 325. In addition, the main controller 40 performs control to an upper limit of 1500 W or less of an AC plug socket by varying a target rotation speed of the motor 14 through the inverter unit 33 so as not to exceed 15 A by a load current detection signal of the AC load current detection unit 37.

Air is compressed by the rotation of the motor 14, and the internal pressure of air tanks 12a and 12b gradually increases, causing an increase in the current consumption of the motor 14, but the speed of an increase in the internal pressure of the air tanks decreases as the rotation speed decreases. At this time, control in a case where the assist power supply unit 50 extracts and joins power from the battery packs 5 is described.

Distribution of the current consumptions corresponding to the DC-side boosted voltage PVd and the AC-side boosted voltage PVa is determined in accordance with a potential difference between PVd and PVa. However, since a current balance fluctuates suddenly in the range of a slight potential difference, it is extremely difficult to arbitrarily adjust the distribution of current consumptions by varying PVd within the range of 5 V with respect to PVa without performing current control in FIG. 19(2). In addition, there is a relation such as the transformer 51 and the internal resistance of the battery 5, a DC boosting side does not necessarily become dominant as illustrated in FIG. 19(3) even when the potential difference is 5 V or more, and thus it is just a guideline. For example, in a case where a current value (that is, a current setting value based on current feedback) which is limited by the assist power supply unit 50 which is a DC-side power supply is small, there is no problem even when the potential difference between PVd and PVa is approximately 1 V (may be equal to or greater than VF of the series diode 82). That is, when a sufficient potential difference is secured as illustrated in FIG. 19(4), a current can be applied up to a current value desired to be limited by the assist power supply unit 50, but it may peak at a current smaller than the limit current in a case where the potential difference is small.

Strictly speaking, in FIG. 19, the current consumption of the motor 14 is not represented linearly like an effective current on the right, but fluctuates severely at all times. Also in FIG. 19(4), the distribution of current consumptions on the assist power supply unit 50 side increases by setting a high PVd voltage, but a duty of PWM control of the assist power supply unit 50 is limited by a current feedback circuit, and thus the PVd voltage decreases instantaneously. Thereby, when the current distribution changes and the current consumption decreases at the next timing, a voltage is increased this time until limitation by the voltage feedback circuit is performed. In this manner, while repeating a cycle in which the PVd voltage increases→the current consumption increases→the PVd voltage decreases→the current consumption decreases→the PVd voltage increases, effectively set power is extracted. In addition, it is desirable that the PVd voltage be set to 375 V or more, but this is just a guideline for a target value at the time of performing voltage feedback on the PVd voltage. In a case where a current value is 2 A or more even in a state where the PVd voltage is less than 375 V, a duty of PWM control is decreased by current feedback, and the PVd voltage may be set to be less than 375 V.

Figure 20:
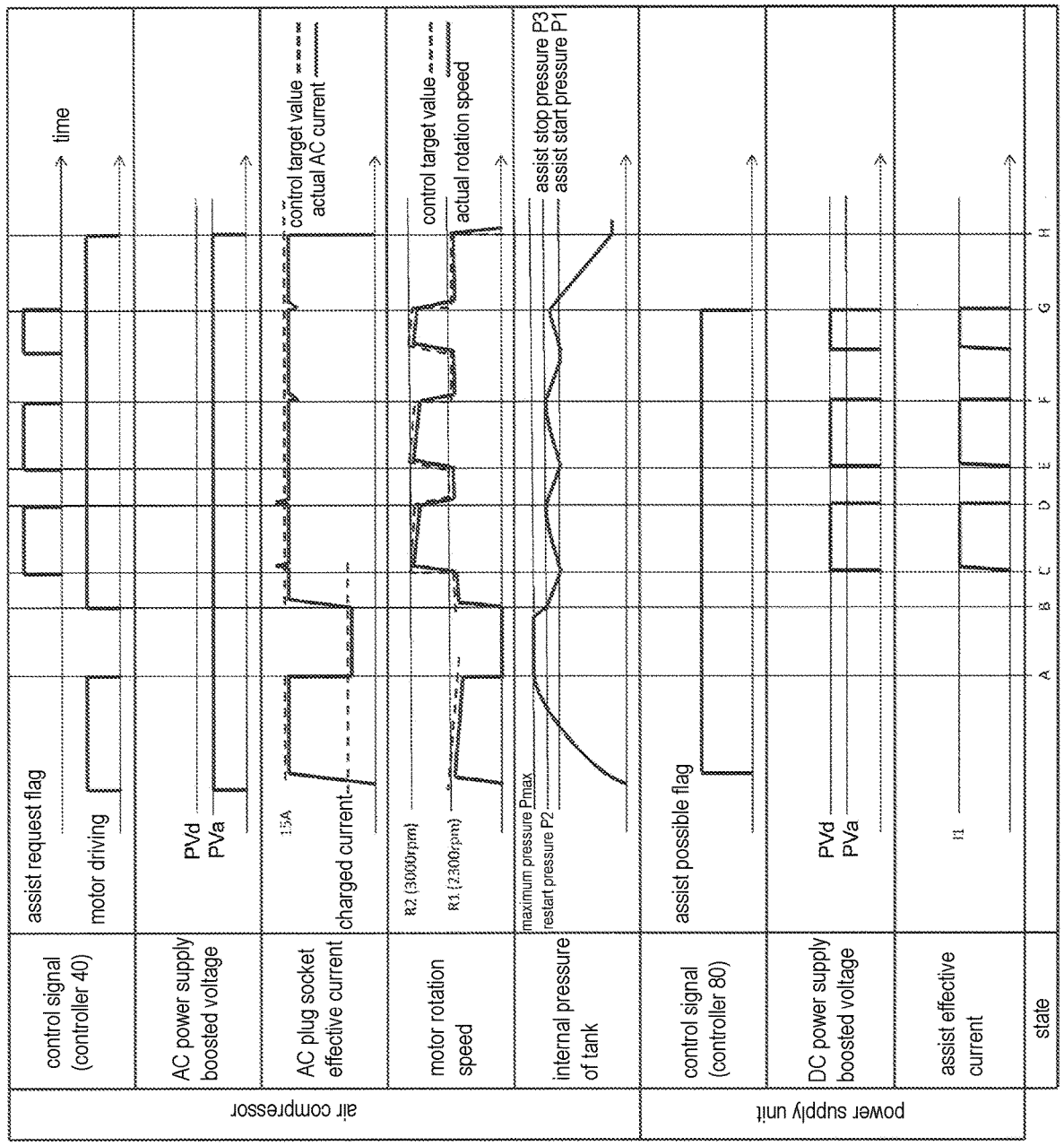
FIG. 20 is a time chart illustrating the operation of an air compressor according to the third embodiment.

FIG. 20 is a time chart illustrating the operation of the air compressor according to the third embodiment. When an operation button 192 on an operation panel 19 in FIG. 18 is pressed, the internal pressure of the air tanks increases with the rotation of the motor 14 by motor driving control of the main controller 40. Here, the setting of assist is performed in accordance with an assist request flag received from the main controller 40 and an assist possible flag received from the sub-controller 80, and is set to be in a mode in which power assist is executed (power is extracted from the battery packs 5 by the operation of the assist power supply unit 50) in a case where the sub-controller 80 outputs the assist possible flag (assist possible flag: H) and the main controller 40 outputs the assist request flag (assist request flag: H), that is, an assist mode. At this time, a motor current fluctuates greatly at all times, and thus it should be noted that there is a time difference due to the processing of a circuit filter and the controllers 40 and 80 in a case where current limitation is performed with an effective current. An AC power supply boosted voltage (an output voltage of the main boosting power supply unit 32) is set to be PVa, a DC power supply boosted voltage (an output voltage of the assist power supply unit 50) during assist is set to be PVd, and a relation of PVd >PVa is established. When an AC load current reaches approximately 15 A, the main controller 40 performs control so that a current immediately before 15 A is maintained while gradually decreasing a target value of the motor rotation speed.

When the internal pressure of the air tanks is extremely close to 0 at a point in time before a state A, a sudden increase in the rotation speed occurs when a maximum target rotation speed is set to R2 (3000 rpm) in advance, which makes a user feel uncomfortable, and thus an initial maximum target rotation speed is set to R1 (2300 rpm), which is lower than R2, to perform motor driving. However, in order to prioritize an increase in the internal pressure of the air tanks, the maximum target rotation speed may be set to R2 from a point in time when the motor 14 is started up. At this point, there is no assist request flag (assist request flag: L), and an assist effective current is also zero.

State A: When the internal pressure of the air tanks reaches a maximum pressure Pmax, the main controller 40 stops rotating the motor. Although omitted here, the main controller 40 transmits communication indicating being chargeable to the sub-controller 80, and thus the charging of the battery pack 5 can be started with a free AC current. The sub-controller 80 starts charging control.

State B: When the internal pressure of the air tanks decreases by a fixed amount, the main controller 40 stops charging when the pressure reaches a restart pressure P2, and attempts to increase the pressure by rotating the motor 14 again.

State C: In a case where the amount of air used is large regardless of the restart of the motor 14, the internal pressure of the air tanks further decreases to an assist start pressure P1. Then, the sub-controller 80 with the assist possible flag starts power assist in accordance with the assist request flag received from the main controller 40. At this time, when the main controller 40 increases the target rotation speed to R2 at once, an increase in the actual rotation speed of the motor due to the power assist cannot catch up, and thus an overshoot of an AC current occurs. In order to avoid such an overshoot of the AC current, it is preferable to actually perform the control of a state E, which will be described later.

State D: When the increase in the internal pressure of the air tanks due to the power assist exceeds the amount of air used and the pressure reaches an assist stop pressure P3, the main controller 40 lowers the assist request flag, and thus the sub-controller 80 stops assist. At this time, when the target rotation speed is gradually decreased, and a decrease in the actual rotation speed due to the stopping of the assist is faster, an overshoot of an AC current occurs similarly. In order to avoid such an overshoot of the AC current, it is preferable to actually perform the control of a state F, which will be described later.

State E: For the state C, when the target rotation speed is gradually increased in accordance with an increase in the actual rotation speed at the start of assist, an overshoot of an AC current does not occur. That is, when the assist is started, a maximum target rotation speed is changed from R1 to R2, but normal control may be performed so that the AC current does not exceed 15 A. Even when an increase in the actual rotation speed due to the assist is faster than the update of the target rotation speed, only a temporary undershoot of the AC current occurs and no actual damage occurs, which is safer.

State F: For the state D, when the maximum target rotation speed is decreased from R2 to R1 at once when the assist is stopped, an overshoot does not occur. In a case where a difference between R2 and R1 is extremely large, a decrease in the actual rotation speed is significantly slower, and thus a temporary undershoot occurs in this case, but there is no problem.

State G: This is an example of a case where assist is stopped during power assist. The sub-controller 80 may lower the assist possible flag due to factors such as a decrease in a battery voltage and an increase in the temperature of the battery, but a case where the battery pack 5 is removed is assumed. Since the assist power disappears instantly when the battery pack 5 is removed, it is necessary to immediately decrease the maximum target rotation speed from R2 to R1 in order to prevent an overshoot of an AC current. In a case where the sub-controller 80 determines that there is an abnormality in accordance with a battery voltage monitoring signal of the battery voltage detection unit 46, the sub-controller 80 can immediately lower the assist possible flag and transmit the occurrence of an abnormality to the main controller 40 by communication, but there is a concern that this will cause a time difference. Consequently, a battery voltage monitor signal of the sub-controller 80 may have a function that can be interrupted by edge detection in addition to normal battery voltage monitoring. In addition, depending on a communication timing, a time difference also occurs in the setting of a maximum target rotation speed by the main controller 40, and thus it is even preferable that the assist possible flag from the sub-controller 80 is similarly set to be an edge interrupt. Thereby, also in a case where the battery pack 5 is removed, the assist can be stopped while preventing an overshoot of an AC current.

State H: This is a state where an operator manually stops the motor 14.

Figure 21:
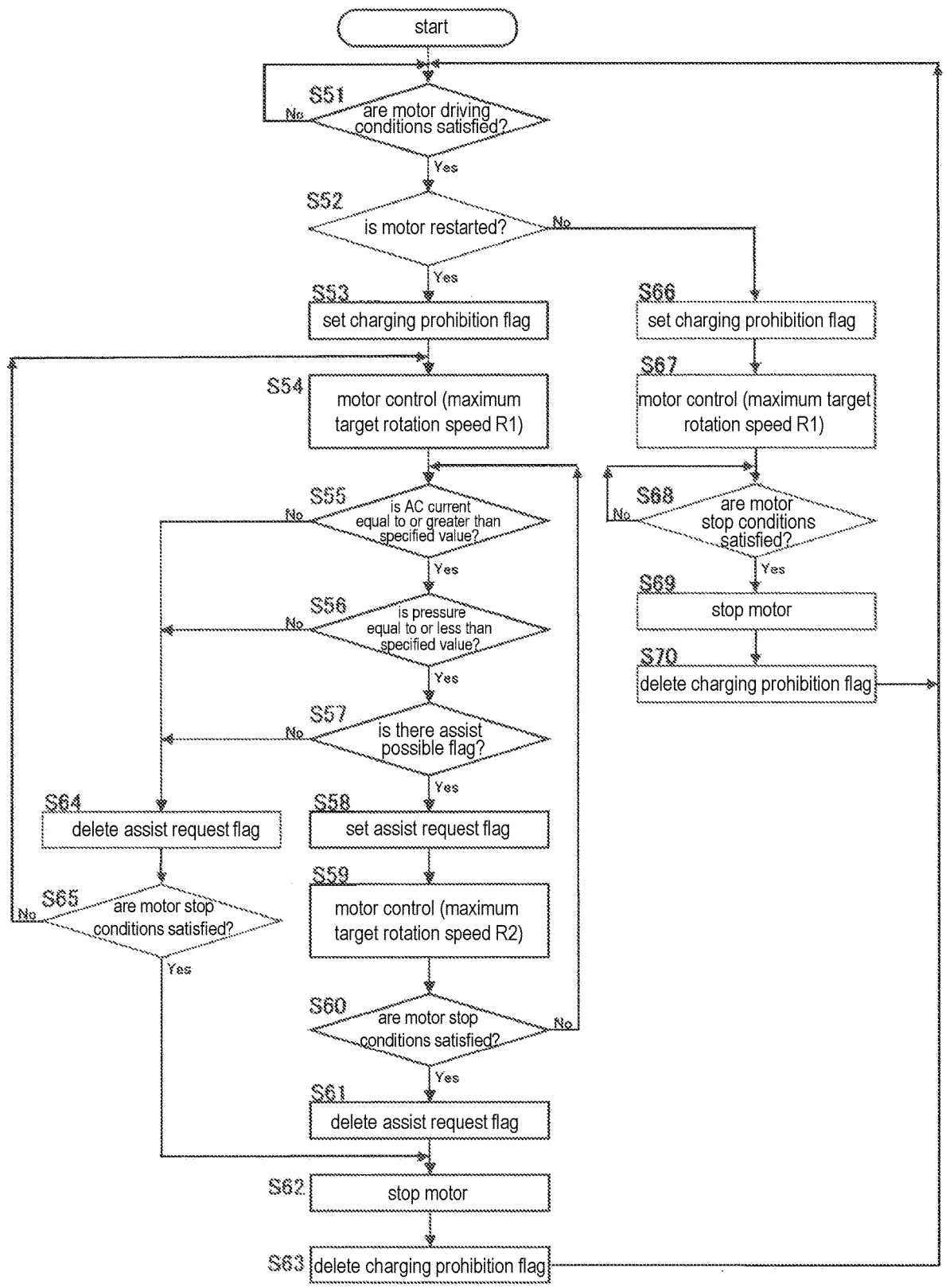
FIG. 21 is a flowchart illustrating the operation of a main controller 40.

FIG. 21 is a flowchart illustrating the operation of the main controller 40. After the operation is started, the main controller 40 determines in step S51 whether or not motor drive conditions are satisfied. In the case of No in which the motor drive conditions are not satisfied, step S51 is repeated. In the case of Yes in which the motor drive conditions are satisfied, it is confirmed in step S52 whether or not the current motor driving is restart. In the case of restart, a charging prohibition flag is set in step S53 (charging prohibition flag: H), and motor control is performed with a maximum target rotation speed R1 in step S54.

Next, in step S55, it is determined whether or not an AC current is equal to or greater than a specified value (for example, 14.7 V or more). In the case of Yes in "AC current is equal to or greater than specified value", it is determined in step S56 whether or not the internal pressure of the air tanks is equal to or less than a specified value. In the case of Yes in which the internal pressure of the air tanks is equal to or less than the specified value, it is determined in step S57 whether or not there is an assist possible flag of the sub-controller 80. In the case of Yes in which there is an assist possible flag (assist possible flag: H), an assist request flag is set in step S58 (assist request flag: H), and motor control is performed with a maximum target rotation speed R2 in step S59. In addition, it is determined in step S60 whether or not motor stop conditions are satisfied. In a case where the motor stop conditions are satisfied, a determination result in step S60 is Yes, the assist request flag is deleted in step S61 (assist request flag: L), the motor 14 is stopped in step S62, the charging prohibition flag is deleted in step S63 (charging prohibition flag: L), and the operation returns to step S51 to determine whether or not motor driving conditions are satisfied. In a case where a determination result in step S60 is No, the operation returns to step S55. In a case where determination results in steps S55, S56, and S57 are No, the operation proceeds to step S64, the assist request flag is deleted, and the operation proceeds to step S65 to determine whether or not the motor stop conditions are satisfied. In a case where the motor stop conditions are satisfied, a determination result in step S65 is Yes, and the operation proceeds to step S62. In a case where the motor stop conditions are not satisfied, a determination result in step S65 is No, and the operation returns to step S54. In a case where a determination result in step S52 is No, the motor is driven for the first time, and assist control is not performed. In this case, after the charging prohibition flag is set in step S66, motor control is performed with a maximum target rotation speed R1 in step S67. Next, in step S68, determination regarding whether or not the motor stop conditions are satisfied is repeatedly performed until the motor stop conditions are satisfied, that is, until a determination result in step S68 is Yes. In a case where a determination result in step S68 is Yes, the motor is stopped in step S69, the charging prohibition flag is removed in step S70, and the operation returns to step S51.

Figure 22:
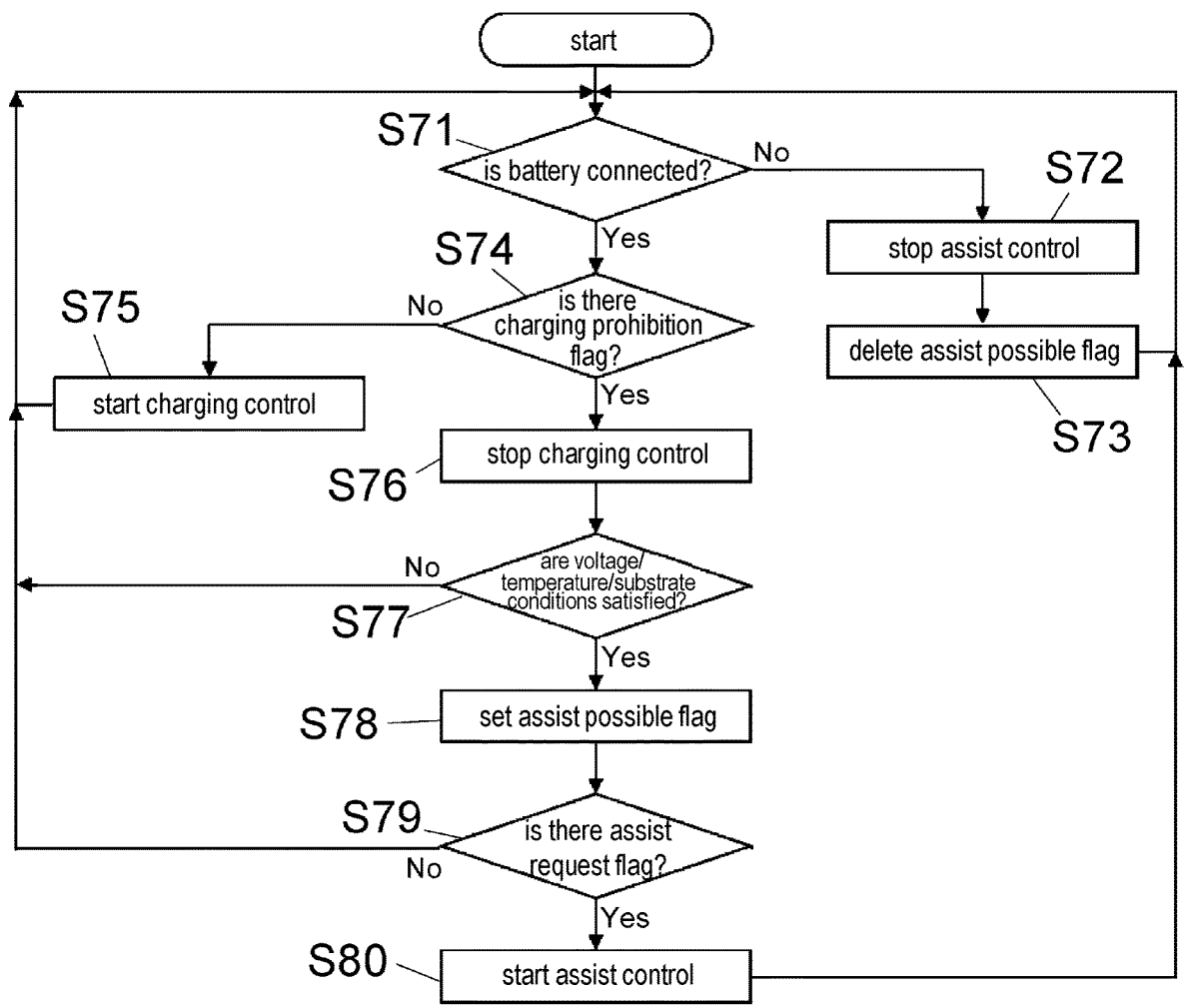
FIG. 22 is a flowchart illustrating the operation of a sub-controller 80.

FIG. 22 is a flowchart illustrating the operation of the sub-controller 80. After the operation is started, the sub-controller 80 determines in step S71 whether or not the battery is connected. In a case where a determination result in step S71 is No, there is no battery pack, and thus the assist control is stopped in step S72, the assist possible flag (assist possible flag: L) is deleted in step S73, and the operation returns to step S71.

In a case where a determination result in step S71 is Yes, and the battery pack is connected, it is determined in step S74 whether or not there is a charging prohibition flag. In a case where a determination result in step S74 is No (charging prohibition flag: L), charging is permitted, charging control is started in step S75, and the operation returns to step S71.

In a case where a determination result in step S74 is Yes (charging prohibition flag: H), charging is prohibited, and thus charging control is stopped in step S76. Then, it is determined in step S77 whether or not the voltage of the battery pack, the temperature of the battery pack, and the state (temperature and the like) of a substrate including a switching element and the like satisfy assist possible conditions. When a determination result in step S77 is yes and it is determined that assist can be performed, an assist possible flag is set in step S78 (assist possible flag: H). Then, it is determined in step S79 whether or not there is an assist request flag. When a determination result in step S79 is Yes, that is, there is an assist request flag (assist request flag: H), assist control is started in step S80, and thereafter, the operation returns to step S71. When a determination result in step S77 is No, that is, assist cannot be performed, and when a determination result in step S79 is No, that is, there is no assist request flag (assist request flag: L), the operation proceeds to step S71 without performing assist control.

Figure 23:
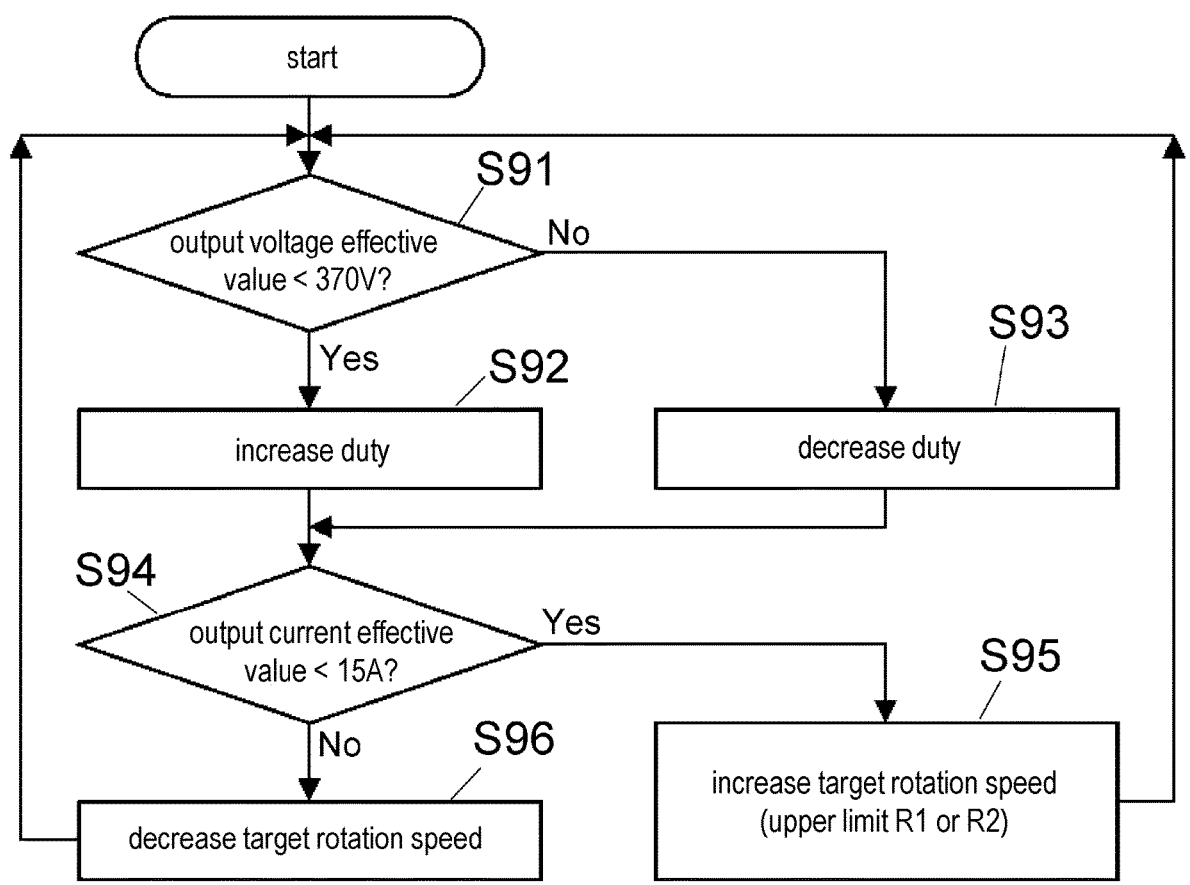
FIG. 23 is a flowchart illustrating the operation of the main controller 40 and a main boosting power supply unit 32 including a boosted voltage controller 325.

FIG. 23 is a flowchart illustrating operations of the main controller 40 and the main boosting power supply unit 32 including the boosted voltage controller 325 among the specific operations of the motor control in step S53 and step S58 in the flowchart of FIG. 21. After the operation is started, the main controller 40 compares the output voltage effective value (PVa) of the main boosting power supply unit 32 which is detected by the boosted voltage detection unit 38 with 370 V which is a target value (second voltage target value) of the output voltage in step S91. That is, it is determined whether or not the condition of the "output voltage effective value (PVa)<370 V" is satisfied. When the condition of the "output voltage effective value (PVa)<370 V" is satisfied, a determination result is Yes, and a duty of the switching element in the main boosting power supply unit 32 is increased in step S92 so that the output voltage effective value (PVa) is increased to be brought close to 370 V. In addition, when the condition of the "output voltage effective value (PVa)<370 V" is not satisfied, a determination result is No, and a duty of the switching element in the main boosting power supply unit 32 is decreased in step S93 so that the output voltage effective value (PVa) is decreased to be brought close to 370 V. After step S92 and step S93, the main controller 40 compares the output current effective value detected by the AC load current detection unit 37 with 15 A in step S94 so that an AC load current does not exceed a maximum rated current of 15 A of a plug socket. That is, it is determined whether or not the condition of the "output current effective value <15 A" is satisfied. When the condition of the "output current effective value <15 A" is not satisfied, that is, the output current effective value exceeds the rated current of 15 A of the plug socket, a determination result in step S94 is No. In order to decrease the load of the motor 14 to decrease the output current effective value to 15 A or less, the target rotation speed of the motor 14 is decreased in step S96, and the operation returns to step S91. When the condition of the "output current effective value <15 A" is satisfied, and a determination result in step S94 is Yes, the output current effective value has a margin for the rated current of 15 A of the plug socket. Thus, the target rotation speed of the motor 14 is increased in step S95, and the operation returns to step S91. In a case where the maximum target rotation speed in the flowchart in FIG. 21 is set to R1, an upper limit value in a case where the target rotation speed of the motor 14 is increased in step S95 is R1. Similarly, in a case where the maximum target rotation speed in the flowchart in FIG. 21 is set to R2, an upper limit value in a case where the target rotation speed of the motor 14 is increased in step S95 is R2.

In the flowchart of FIG. 23, a duty of the switching element in the main boosting power supply unit 32, that is, an output voltage effective value (PVa) of the main boosting power supply unit 32, is feedback-controlled by the output voltage of the main boosting power supply unit 32. In addition, a target rotation speed is feedback-controlled by an output current value to be prevented from exceeding 15 A.

Figure 24:
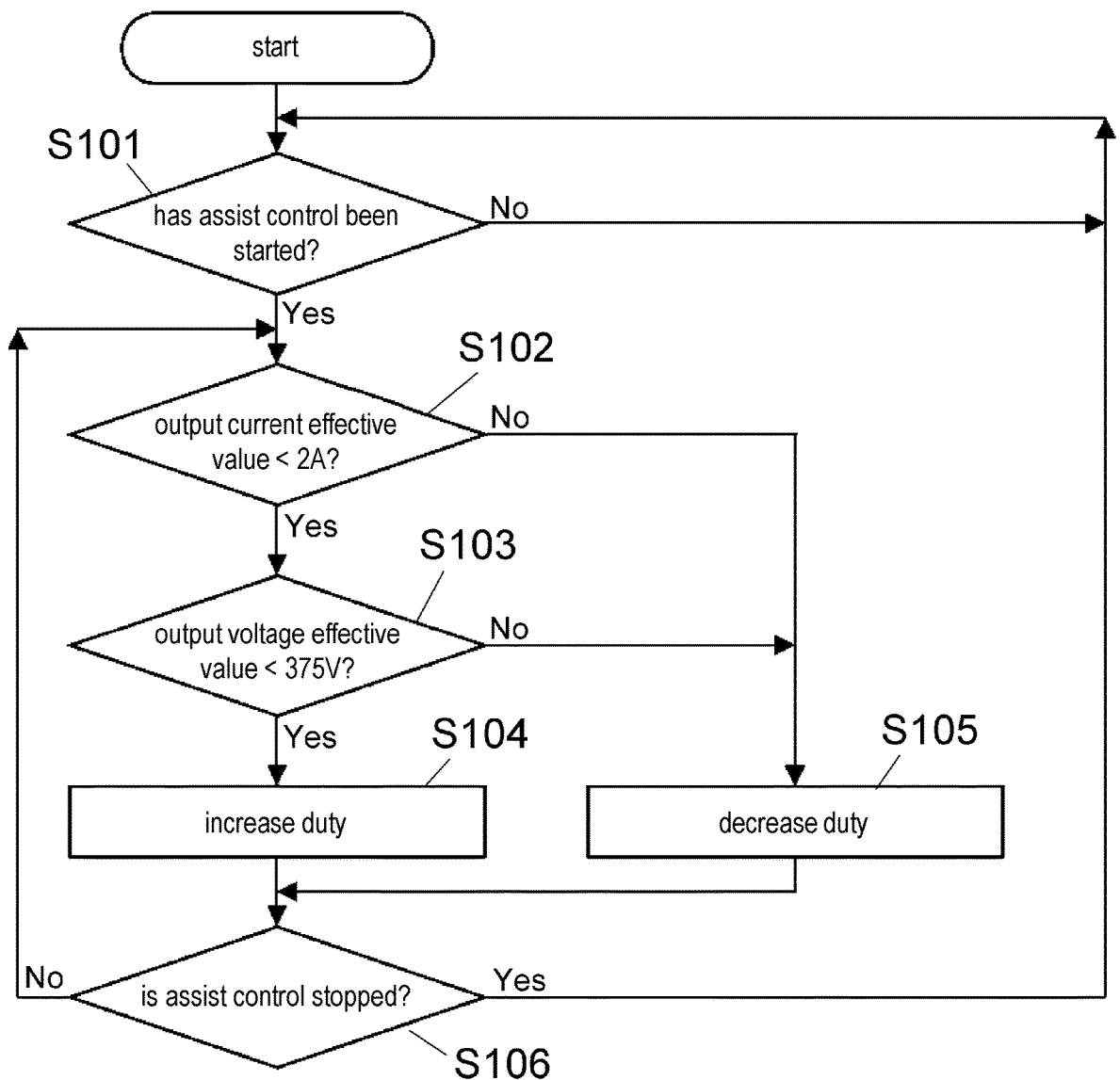
FIG. 24 is a flowchart illustrating the operation of the sub-controller 80 and an assist power supply unit 50 including an assist power supply driving circuit 54.

FIG. 24 is a flowchart illustrating the operation of the assist power supply unit 50 including the sub-controller 80 and the assist power supply driving circuit 54 among the specific operations of the motor control in steps S53 and S58 in the flowchart of FIG. 21. After the operation is started, the sub-controller 80 determines in step S101 whether or not assist control has been started. When a determination result in step S101 is No, step S101 is repeated. When a determination result in step S101 is Yes, assist control is started, and the supply of power from the assist power supply unit 50 is started. Thus, a voltage is detected by the assist voltage detection unit 60, and a current is detected from the assist current controller 57. Next, the sub-controller 80 performs current limitation so that an output current effective value of the assist power supply unit 50 which is detected by the assist current controller 57 does not exceed 2 A, and thus it is determined in step S102 whether or not the condition of the "output current effective value<2 A" is satisfied. In a case where a determination result in step S102 is Yes and the condition of the "output current effective value<2 A" is satisfied, the output voltage effective value (PVd) detected by the assist voltage detection unit 60 is compared with a target value (first voltage target value) of an output voltage. That is, it is determined in step S103 whether or not the "output voltage effective value (PVd)<375 V" is satisfied. In a case where a determination result in step S103 is Yes and the condition of the "output voltage effective value (PVd) <375 V" is satisfied, the duty of the switching element in the assist power supply unit 50 is increased in step S104 so that the output voltage effective value (PVd) is increased to be brought close to 375 V. In a case where a determination result in step S102 is No and the condition of the "output voltage effective value<2 A" is not satisfied, the ratio of the output current effective value of the assist power supply unit 50 is higher in the comparison with the output current effective value of the main boosting power supply unit 32, and it is estimated that the power assist from the battery pack 5 is out of an appropriate range. Thus, the duty of the switching element in the assist power supply unit 50 is decreased in step S105 in order to reduce the ratio of the output current effective value of the assist power supply unit 50 by decreasing the output voltage effective value of the assist power supply unit 50. In addition, also when a determination result in step S103 is No and the condition of the "output voltage effective value (PVd)<375 V" is not satisfied, the duty is decreased in step S105 so that the output voltage effective value (PVd) is decreased to be brought close to 375 V. After step S104 or step S105 is executed, it is determined in step S106 whether or not to stop the assist control. In a case where a determination result in step S106 is Yes, the assist control is stopped, and the operation returns to step S101. In a case where a determination result in step S106 is No, the assist control can be continued, and the operation returns to step S102.

In the flowchart of FIG. 24, the duty of the switching element in the assist power supply unit 50 is feedback-controlled using both a current value and a voltage value. Thereby, an output current on the battery pack 5 side can be limited, and thus it is possible to reliably avoid a situation where an AC current decreases and an output current on the battery pack 5 side increases. In addition, the duty can be directly controlled based on a current value, which leads to good responsiveness.

According to this third embodiment, the following effects can be achieved. Note that, for convenience of description, the effects are described as those of the third embodiment, but similar effects may be obtained also in the configurations of the first and second embodiments.

(1) The air compressor 1 includes the assist power supply unit 50 serving as a first power supply unit that boosts an output voltage of the battery pack 5 as a DC power supply and outputs the boosted voltage to the motor 14, a second power supply unit (a circuit configuration including the rectification unit 31 and the main boosting power supply unit 32) which is electrically connected to the motor 14 in parallel together with the assist power supply unit 50, boosts the voltage of the external AC power supply 39, and outputs the boosted voltage to the motor 14, and the controllers 40 and 80 that control output voltages of the assist power supply unit 50 and the main boosting power supply unit 32, and the controllers 40 and 80 control boosting amounts of the first power supply unit and the second power supply unit so that power output from the first power supply unit and power output from the second power supply unit are combined and supplied to the motor 14. Thereby, it is possible to improve the output of the air compressor 1 (increase the compressed air pressure) by power assist using the battery packs 5.

(2) A first output current detection unit (a circuit including the assist current controller 57 and the current detection resistor 58) that detects an output current value of the first power supply unit is provided, and the controllers 40 and 80 control a boosting amount of the first power supply unit based on a detected value of the first output current detection unit, and thus power assist can be performed such that an output current extracted from the battery pack 5 is in an appropriate range, that is, the output current falls below a predetermined first current threshold value (for example, 2 A).

(3) The first power supply unit includes a first output voltage detection unit (assist voltage detection unit 60) that detects an output voltage value PVd thereof, the second power supply unit includes a second output voltage detection unit (boosted voltage detection unit 38) that detects an output voltage value PVa thereof, and the controllers 40 and 80 can control a boosting amount of the second power supply unit so that a detected value of the second output voltage detection unit matches a predetermined second voltage target value (for example, 370 V), and can control a boosting amount of the first power supply unit so that a detected value of the first output voltage detection unit matches a predetermined first voltage target value (for example, 375 V) which is larger than the second voltage target value. Thereby, it is possible to appropriately set a distribution of power between the first power supply unit and the second power supply unit.

(4) The controllers 40 and 80 can control a boosting amount of the first power supply unit so that the detected value of the first output current detection unit falls below the first current threshold value while the first voltage target value is kept constant. Thereby, it is possible to keep the power assist from the battery pack 5 within an appropriate range.

Although the present invention has been described above using the embodiments as examples, it should be understood by those skilled in the art that various modifications can be made to the components and the processing processes in the embodiments within the scope of the claims. In the following, modification examples will be described.

In the first embodiment described above, in FIG. 1 and FIG. 3, a configuration in which the boosting adapter 3 operating with a battery power supply is externally attached to the air compressor main body portion 2 including a second power supply unit operating with a commercial AC power supply has been adopted. However, a circuit configuration equivalent to the boosting adapter may be accommodated in a housing (or a cover) of the air compressor, as well as a battery as required. In addition, the air compressor main body portion 2 and the boosting adapter 3 are connected to each other through a cable, but a configuration in which a connector unit on the boosting adapter 3 side is fitted into a connector unit on the air compressor main body portion 2 side to perform electrical and mechanical connection may be adopted.

In the first embodiment, in the description of FIG. 6, a maximum current extraction amount is changed in a stepwise manner in accordance with the internal temperature and output voltage of the battery pack 5, but it may be changed continuously.

In the first, second, and third embodiments described above, a configuration in which two battery packs are connected to the air compressor has been described, but the number of battery packs to be connected may be one or two or more.

In the first, second, and third embodiments described above, an output voltage of the battery pack is directly detected, but in a case where the battery pack has a built-in remaining capacity detection circuit, a detection signal of the remaining capacity detection circuit is transmitted to a detection circuit of the air compressor. In this case, since the output voltage of the battery pack decreases when the remaining capacity is reduced, the detection circuit can receive the remaining capacity detection signal from the battery pack to indirectly detect a decrease in the output voltage of the battery pack.

In the second embodiment described above, an output voltage of an AC power supply is not detected, but a configuration may also be adopted in which the controller decreases the first target value (an output voltage setting value of the assist power supply unit) and the second target value (a boosted voltage setting value of the main boosting power supply unit) more when the output voltage of the AC power supply is less than a third threshold value than when the output voltage of the AC power supply is equal to or greater than the third threshold value by allowing the output voltage of the AC power supply to be detected in the detection circuit (for example, by applying a voltage detection circuit that detects a voltage on an input side or an output side of the rectification unit 31 in FIG. 14A).

Although an air compressor has been illustrated as a work machine in the present embodiment, the present invention can be applied to work machines for which there is a demand for supplementing the shortage of power supplied by an AC power supply with power supplied by a battery power supply.

The invention claimed is:

1. A work machine comprising:
a motor;
a first power supply unit connected to a DC power supply, boosting an output voltage of the DC power supply, and outputting the boosted output voltage to the motor;
a second power supply unit electrically connected to the motor in parallel together with the first power supply unit, connected to an external AC power supply, boosting an output voltage of the AC power supply, and outputting the boosted output voltage to the motor; and
a controller controlling boosting amounts of the first power supply unit and the second power supply unit,
wherein the controller controls the boosting amounts of the first power supply unit and the second power supply unit so that power output from the first power supply unit and power output from the second power supply unit are combined and supplied to the motor, and an output voltage value of the first power supply unit becomes larger than an output voltage value of the second power supply unit.

2. The work machine according to claim 1, further comprising:
a first output current detection unit detecting an output current value of the first power supply unit,
wherein the controller controls a boosting amount of the first power supply unit based on a detected value of the first output current detection unit.

3. The work machine according to claim 2, wherein the controller controls the boosting amount of the first power supply unit so that the detected value of the first output current detection unit falls below a predetermined first current threshold value.

4. The work machine according to claim 3, further comprising:
a first output voltage detection unit detecting an output voltage value of the first power supply unit; and
a second output voltage detection unit detecting an output voltage value of the second power supply unit,
wherein the controller controls the boosting amount of the second power supply unit so that a detected value of the second output voltage detection unit matches a predetermined second voltage target value, and controls the boosting amount of the first power supply unit so that a detected value of the first output voltage detection unit matches a predetermined first voltage target value which is larger than the second voltage target value.

5. The work machine according to claim 4, wherein the controller controls the boosting amount of the first power supply unit so that the detected value of the first output current detection unit falls below the first current threshold value while the first voltage target value is fixed.

6. The work machine according to claim 1, further comprising:
a rotation speed detection unit detecting a rotation speed of the motor; and
a motor driving circuit connected between the first power supply unit and the second power supply unit and the motor and controlling driving of the motor by changing an amount of power to be supplied to the motor,
wherein the controller is able to set a target rotation speed of the motor and controls the motor driving circuit so that a detected value of the rotation speed detection unit matches the target rotation speed.

7. The work machine according to claim 6, wherein the controller is able to switch between an assist mode and a single mode, the assist mode being a mode in which power output from the first power supply unit and power output from the second power supply unit are combined and supplied to the motor, the single mode being a mode in which power output from the second power supply unit is supplied to the motor, and power is not supplied from the first power supply unit.

8. The work machine according to claim 7, wherein the controller sets the target rotation speed in the assist mode to be higher than the target rotation speed in the single mode.

9. The work machine according to claim 1, wherein the first power supply unit is able to change an output voltage value by PAM control.

10. The work machine according to claim 9, further comprising:
a first output voltage detection unit detecting an output voltage value of the first power supply unit,
wherein the controller controls a boosting amount of the first power supply unit so that a detected value of the first output voltage detection unit matches a first voltage target value, sets the first voltage target value to be less than a predetermined assist threshold value in a case where an output current value of the AC power supply is less than a first current value, and sets the first voltage target value to be equal to or greater than the assist threshold value in a case where the current value of the AC power supply is equal to or greater than the first current value.

11. The work machine according to claim 10, wherein the controller is able to change the first voltage target value in a range of the assist threshold value or more so that power output from the first power supply unit and power output from the second power supply unit are combined and supplied to the motor.

12. The work machine according to claim 1, wherein a work machine main body portion and an adapter are electrically connected to each other, the work machine main body portion including the second power supply unit, the adapter being provided outside the work machine main body portion, having the battery pack mountable thereon, and including the first power supply unit.

13. The work machine according to claim 1, further comprising:
a power detection circuit detecting a state of power flowing through the first power supply unit and the second power supply unit,
wherein the controller sets a first target value, which is a target value of the output voltage of the first power supply unit, and a second target value, which is a target value of the output voltage of the second power supply unit, so that power output from the first power supply unit and power output from the second power supply unit are combined and supplied to the motor, and the controller changes the first target value and the second target value in accordance with a detected value of the power detection circuit.

14. The work machine according to claim 13, wherein the power detection circuit detects an output voltage of the DC power supply, and the controller decreases the first target value and the second target value more when the output voltage of the DC power supply is less than a first threshold value than when the output voltage of the DC power supply is equal to or greater than the first threshold value.

15. The work machine according to claim 14, wherein the controller stops output of the first power supply unit when the output voltage of the DC power supply is less than a second threshold value which is smaller than the first threshold value.

16. A work machine comprising:
a motor;
a first power supply unit connected to a DC power supply, boosting an output voltage of the DC power supply, and outputting the boosted output voltage to the motor;
a second power supply unit electrically connected to the motor in parallel together with the first power supply unit, connected to an external AC power supply, boosting an output voltage of the AC power supply, and outputting the boosted output voltage to the motor; and
a controller controlling boosting amounts of the first power supply unit and the second power supply unit,
wherein the controller controls an output voltage value of the first power supply unit becomes larger than an output voltage value of the second power supply unit, so that power output from the first power supply unit and power output from the second power supply unit are combined and supplied to the motor.

* * * * *